United States Patent
Imaoka et al.

(10) Patent No.: US 8,696,133 B2
(45) Date of Patent: Apr. 15, 2014

(54) PROJECTION OPTICAL SYSTEM AND IMAGE PROJECTING DEVICE

(75) Inventors: Masayuki Imaoka, Izumiotsu (JP); Kohtaro Hayashi, Toyonaka (JP); Jun Ishihara, Kobe (JP); Yasumasa Sawai, Yamato Takada (JP)

(73) Assignee: Konica Minolta Opto, Inc., Tokyo (JP)

( * ) Notice: Subject to any disclaimer, the term of this patent is extended or adjusted under 35 U.S.C. 154(b) by 88 days.

(21) Appl. No.: 13/395,617

(22) PCT Filed: Sep. 11, 2009

(86) PCT No.: PCT/JP2009/065895
§ 371 (c)(1),
(2), (4) Date: Mar. 12, 2012

(87) PCT Pub. No.: WO2011/030435
PCT Pub. Date: Mar. 17, 2011

(65) Prior Publication Data
US 2012/0170000 A1  Jul. 5, 2012

(51) Int. Cl.
*G03B 21/14* (2006.01)
(52) U.S. Cl.
USPC .......... 353/20; 353/7; 353/8; 353/33; 353/38; 353/98; 349/5; 349/9; 359/242; 359/462
(58) Field of Classification Search
USPC ......... 353/7, 8, 20, 31, 33, 37, 38, 69, 70, 94, 353/98, 99; 359/242, 245, 462, 464, 466, 359/475, 485.01, 5, 7–9
See application file for complete search history.

(56) References Cited

U.S. PATENT DOCUMENTS

| | | | |
|---|---|---|---|
| 7,172,290 B2* | 2/2007 | Li | 353/37 |
| 7,236,285 B2* | 6/2007 | Uchiyama et al. | 359/242 |
| 2009/0128780 A1* | 5/2009 | Schuck et al. | 353/20 |

FOREIGN PATENT DOCUMENTS

| | | |
|---|---|---|
| JP | 3-48816 | 3/1991 |
| JP | 09-026555 | 1/1997 |
| JP | 2001-157229 | 6/2001 |
| JP | 2003-185969 | 7/2003 |
| WO | WO 2008/141247 | 11/2008 |

* cited by examiner

*Primary Examiner* — Sultan Chowdhury
(74) *Attorney, Agent, or Firm* — Cozen O'Connor

(57) ABSTRACT

A projection optical system (6) comprises a relay optical system (61), a PBS prism (71), and two projection lenses (81). The image light beam from a DMD (5) enters the PBS prism (71) via the relay optical system (61), is polarization-split there, and is directed to a screen by means of the two projection lenses (81). Displaying an image by means of the DMD (5) is controlled while the polarized states of the light beams produced by the polarization split by means of the PBS prism (71) are controlled. Thereby, a three-dimensionally viewable image and a high-resolution image created by pixel-offset can be projected. Since the relay optical system (61) is provided, the lens backs of the projection lenses (81) can be shortened, and the projection lenses (81) and further the projection optical system (6) can be made compact.

25 Claims, 27 Drawing Sheets

REFERENCE POSITION (TELE)

REFERENCE POSITION (MIDDLE)

DECENTERED POSITION (WIDE)

FIG.26

| PATTERN | A | B | C | D |
|---|---|---|---|---|
| DIRECTION OF REFLECTION OF IMAGE LIGHT BY MICRO-VIBRATION MIRROR | LEFT | LEFT | RIGHT | RIGHT |
| LIGHT EMERGING FROM POLARIZATION CONVERTING ELEMENT CORRESPONDING TO 1ST PROJECTION LENS | RIGHT CIRCULARLY POLARIZED | LEFT CIRCULARLY POLARIZED | LEFT CIRCULARLY POLARIZED | RIGHT CIRCULARLY POLARIZED |
| LIGHT EMERGING FROM POLARIZATION CONVERTING ELEMENT CORRESPONDING TO 2ND PROJECTION LENS | LEFT CIRCULARLY POLARIZED | RIGHT CIRCULARLY POLARIZED | RIGHT CIRCULARLY POLARIZED | LEFT CIRCULARLY POLARIZED |
| PROJECTION POSITION | UPPER LEFT | LOWER LEFT | LOWER RIGHT | UPPER RIGHT |

FIG.27
PATTERN A
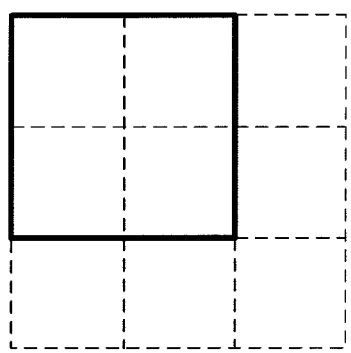
PATTERN D
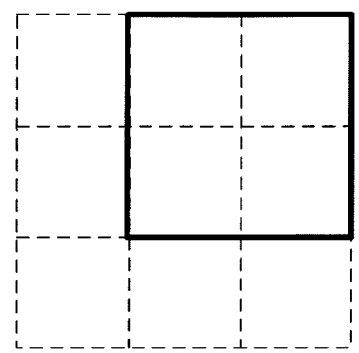
PATTERN B
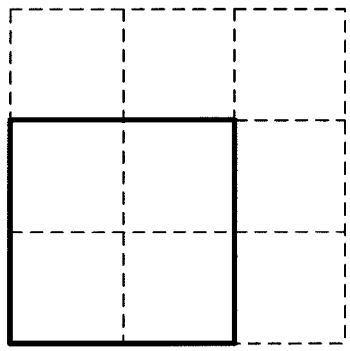
PATTERN C
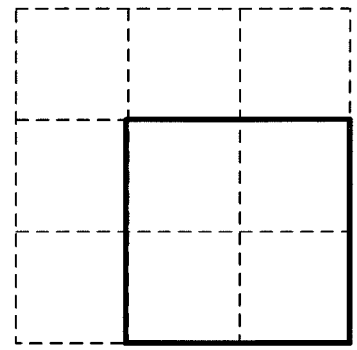

PROJECTION OPTICAL SYSTEM AND IMAGE PROJECTING DEVICE

RELATED APPLICATIONS

This application is a U.S. National Phase Application under 35 USC 371 of International Application PCT/JP2009/065895 filed Sep. 11, 2009.

TECHNICAL FIELD

The present invention relates to a projection optical system for directing image light from a display element to a projection surface, and also relates to an image projecting device provided with such a projection optical system.

BACKGROUND ART

Many types of devices that project stereoscopically viewable images have conventionally been proposed, for example in Patent Documents 1 and 2. The devices according Patent Documents 1 and 2 each incorporate two display elements, such as liquid crystal display elements, which display right-eye and left-eye images respectively, which are then projected via respective projection lenses onto a screen. Here, putting the right-eye and left-eye images in different polarization states and requiring the viewer to wear polarizing glasses permits him to view a stereoscopic image. Employing a lenticular plate to split the right-eye and left-eye images to the viewer's right and left eyes, respectively, permits him to view a stereoscopic image even without wearing polarizing glasses.

On the other hand, Patent Document 3 discloses (1) a device that projects, through two projection lenses, two intermediary images obtained by polarization splitting and polarization conversion within a relay optical system; (2) a device that projects, through a single projection lens, one double-size intermediary image obtained by polarization splitting and polarization conversion at the pupil position of a relay optical system; and (3) a device that projects an image by polarization splitting and polarization conversion within a projection lens without the use of a relay optical system. In all these projection methods, one of the polarization-split lights is polarization-converted and, with polarization aligned, the polarization direction is switched at high speed; this permits a viewer wearing polarizing glasses to view a stereoscopic image.

LIST OF CITATIONS

Patent Literature

Patent Document 1: JP-A-2003-185969 A
Patent Document 2: JP-A-H09-026555 A
Patent Document 3: WO/2008/141247

SUMMARY OF INVENTION

Technical Problem

Inconveniently, however, the designs according to Patent Documents 1 and 2 require two display elements, require that illumination light be directed to the two display elements, and require the provision of two projection lenses corresponding to the two display elements and hence a larger holder for them. This makes the devices as a whole larger. Thus, from the perspective of miniaturization, it is desirable that an image projection device incorporating a single display element be capable of projecting a stereoscopically viewable image.

In recent years, as communication networks and recording media come to have increasingly high capacities, images are becoming increasingly high-definition, and demand for projecting high-definition images is increasing. Against this background, to meet such demand, it is desirable that an image projection device incorporating a single display element be capable of projecting a high-definition image by, for example, pixel shifting.

The design according to Patent Document 3 requires polarization splitting and polarization conversion to be performed within a relay optical system or within a projection lens, leading to a complicated construction, and also requires, for polarization splitting and polarization conversion, a long aerial distance, making the optical system larger. Moreover, the tolerance for an eccentric error between the optical blocks across the polarization spitting portion is severe; if a manufacturing error produces block eccentricity, degraded imaging performance results. In a case where two projection images are projected in a form overlaid on each other, if block eccentricity produces asymmetric, different distortion in the two projection images, it is difficult to overlay them accurately.

Moreover, since the design according to Patent Document 3 requires polarization splitting and polarization conversion to be performed within a relay optical system or within a projection lens, the incidence angle of the principal ray with respect to the polarization splitting surface varies with the image position (image height). This causes light transmittance to vary with the image position, resulting in uneven brightness and uneven color, leading to degraded image quality.

The present invention has been made to solve the inconveniences mentioned above, and aims to provide a projection optical system that is free from image degradation ascribable to a manufacturing error and that allows a small device to project a stereoscopically viewable or high-definition image, and to provide an image projecting device provided with such a projection optical system.

Solution to Problem

A projection optical system according to the invention is for directing image light from a display element to a projection surface, and is characterized by comprising: a relay optical system which relays the image light to form an intermediary image of the display image on the display element; a polarization splitting element which polarization-splits the image light emerging from the relay optical system to form two intermediary images as the intermediary image; and two projection lenses which project the two intermediary images on an enlarged scale onto the projection surface so that the images are substantially overlaid together on the projection surface.

In a projection optical system according to the invention, it is preferable that the relay optical system be substantially telecentric to the projection surface side.

In a projection optical system according to the invention, it is preferable that the relay optical system be substantially telecentric both to the display-element side and to the projection-surface side, and, let the absolute value of the magnification of the relay optical system be $\beta$, the equivalent aerial distance from the entrance surface of the most display-element-side lens to the display element surface be La, and the equivalent aerial distance from the exit surface of the most projection-surface-side lens to the intermediary image be Lb, then it is preferable that the formula $$\beta/3 < Lb/La < \beta$$

be fulfilled.

In a projection optical system according to the invention, let the absolute value of the magnification of the relay optical system be β, then it is preferable that the formula $$1 < \beta < 3$$

be fulfilled.

A projection optical system according to the invention may be so designed that it further comprises: a correction mechanism which corrects the relative deviation in position between the two projection images by the two projection lenses on the projection surface; and a zoom mechanism which varies the projection magnification of the projection lens, and that the correction mechanism and the zoom mechanism are provided in at least one of the two projection lenses.

A projection optical system according to the invention may be so designed that the correction mechanism corrects the deviation in position between the two projection images on the projection surface by decentering part of the lenses within the projection lens.

A projection optical system according to the invention may be so designed that it further comprises a first shift mechanism which moves the two projection lenses together parallel to the display surface of the display element.

A projection optical system according to the invention may be so designed that it further comprises a second shift mechanism which moves at least one of the two projection lenses and the relay optical system together parallel to the display surface of the display element.

A projection optical system according to the invention may be so designed that the first shift mechanism moves the two projection lenses and the relay optical system together parallel to the display surface of the display element.

A projection optical system according to the invention may be so designed that the polarization splitting element comprises, joined together: a polarization splitting film which polarization-splits incident light; and two prism blocks which bends the optical paths of the lights polarization-split at the polarization splitting film, and that the two prism blocks each comprise at least one prism and bend the optical paths of the lights after polarization splitting such that the positions of the two intermediary images in the optical paths of the lights coincide in the optical axis direction of the relay optical system.

In a projection optical system according to the invention, it is preferable that the lengths of the two projection lenses in the optical axis direction are set such that the positions of the most projection-surface-side exit surfaces thereof coincide in the optical axis direction.

A projection optical system according to the invention may be so designed that it further comprises polarization controlling means which controls the polarization states of the lights polarization-split at the polarization splitting element, and that the polarization controlling means controls polarization states of incident lights such that the polarization states of emergent lights are identical between the optical paths of the lights and in addition switch alternately between two different polarization states.

A projection optical system according to the invention may be so designed that the polarization controlling means comprises: a first phase plate which converts one of the lights polarization-split at the polarization splitting element into the same polarization direction as the other of the lights; and a polarization converting element which converts the one of the lights incident via the first phase plate after polarization splitting at the polarization splitting element and the other of the lights after polarization splitting simultaneously into, and alternately between, two mutually different polarization states.

A projection optical system according to the invention may be so designed that the polarization controlling means comprises two polarization converting elements which individually convert the polarization states of the lights after polarization-splitting at the polarization splitting element and which convert incident linearly polarized lights into, and alternately between, two mutually different polarization states, and that the polarization converting elements are driven differently to convert the polarization states of the lights polarization-split at the polarization splitting element such that the polarization states of emergent lights are identical.

In a projection optical system according to the invention, the polarization converting element or elements may be disposed in the optical paths of the two projection lenses.

A projection optical system according to the invention may be so designed that it further comprises polarization controlling means which controls the polarization states of the lights polarization-split at the polarization splitting element, and that the polarization controlling means comprises a pixel shift mechanism which moves the projection position half a pixel while changing the polarization states of the lights after polarization-splitting.

A projection optical system according to the invention may be so designed that the pixel shift mechanism comprises first and second shift units disposed, each in a set, in the optical paths of the lights after polarization-splitting, that the first and second shift units each comprise: a polarization converting element which converts incident linearly polarized lights into, and alternately between, two mutually different polarization states; a second phase plate which converts the lights in two polarization states into linearly polarized lights; and a birefringent element which either transmits or shifts the linearly polarized lights from the second phase plate according to polarization directions thereof, and that the birefringent element in the first shift unit and the birefringent element in the second shift unit are arranged so as to shift the linearly polarized lights in mutually perpendicular directions.

A projection optical system according to the invention may be so designed that it further comprises polarization controlling means which controls the polarization states of, and the projection onto the projection surface of, the lights polarization-split at the polarization splitting element, that the positions of the two projection lenses are set such that the projection images by the two projection lenses are shifted half a pixel relative to each other on the projection surface, and that the polarization controlling means controls the polarization states of, and the projection onto the projection surface of, the lights after polarization splitting such that the projection images by the two projection lenses are projected alternately onto the projection surface.

A projection optical system according to the invention may be so designed that the polarization controlling means comprises: a polarization converting element which converts one of the lights polarization-split at the polarization splitting element into, and alternately between, first and second polarization states and which converts the other of the polarization-split lights into, and alternately between, the second and first polarization states; and a polarizing plate which transmits, of the lights polarization-split at the polarization splitting element, the light in one polarization state and intercepts the light in the other polarization state.

An image projecting device according to the invention is characterized by comprising: a display element which displays an image; and a projection optical system which directs image light from the display element to a projection surface, and in that the projection optical system comprises a projection optical system according to the invention as described above.

An image projecting device according to the invention is characterized by comprising: a display element which displays an image; and a projection optical system which directs image light from the display element to a projection surface, in that the projection optical system comprises a projection optical system according to the invention as described above, in that the image projection device further comprises a control unit which controls the display element and the polarization controlling means of the projection optical system, and in that the control unit makes the display element perform image display on a time-division basis and in addition makes, synchronously with the image display, the polarization controlling means switch the emergent lights between the two polarization states on a time-division basis.

An image projecting device according to the invention is characterized by comprising: a display element which displays an image; and a projection optical system which directs image light from the display element to a projection surface, in that the projection optical system comprises a projection optical system according to the invention as described above, in that the image projecting device further comprises a control unit which controls the display element and the first and second shift units of the projection optical system, and in that the control unit makes the display element perform image display on a time-division basis and in addition makes, synchronously with the image display, the polarization converting element of at least one of the first and second shift units switch the emergent lights between the two polarization states on a time-division basis.

An image projecting device according to the invention is characterized by comprising: a display element which displays an image; and a projection optical system which directs image light from the display element to a projection surface, in that the projection optical system comprises a projection optical system according to the invention as described above, in that the image projecting device further comprises a control unit which controls the display element and the polarization controlling means of the projection optical system, and in that the control unit makes the display element perform image display on a time-division basis and in addition makes, synchronously with the image display, the polarization controlling means project the projection image by one of the two projection lenses on the projection surface on a time-division basis.

An image projecting device according to the invention may be so designed that the polarization controlling means, according to a signal from the control unit, brings the lights after polarization splitting in mutually different polarization states and in addition switches alternately between those polarization states.

An image projecting device according to the invention may be so designed that it further comprises a micro-vibration mirror which vibrates with a predetermined period in the direction perpendicular to the direction in which the projection images by the two projection lenses are shifted and which thereby bends the optical path of the image light, and that the control unit controls the micro-vibration mirror so as to determine the direction in which the micro-vibration mirror reflects the image light synchronously with the image display on the display element.

An image projecting device according to the invention may be so designed that it further comprises: a light source which emits light; and an illumination optical system that directs light from the light source to the display element.

Advantageous Effects of the Invention

According to the present invention, the image light from the display element enters the relay optical system, and there an intermediary image of the display image is formed; the image light emerging from the relay optical system is polarization-split at the polarization splitting element, and thus two of the intermediary images are formed. These intermediary images are projected on an enlarged scale by the two projection lenses so as to be substantially overlaid together on the projection surface.

Here, the intermediary images are images by polarization-split lights; thus, by applying a projection optical system according to the invention to an image projecting device, and by, for example, controlling the image display on the display element while controlling the polarization states of the lights, it is possible to project a stereoscopically viewable image, or a high-definition image by pixel shifting (hereinafter abbreviated to projection of various images). Moreover, performing polarization-splitting between the relay optical system and the projection lenses as in the invention makes it possible to project various images without an increase in the size of the optical system and without degradation in image quality ascribable to a manufacturing error.

Moreover, the design including a relay optical system for the formation of an intermediary image of the display image, compared with a design including no relay optical system, helps reduce the back-focal length of the projection lenses, and thus helps make the projection lenses, and hence the projection optical system, smaller and compact. This makes it possible to achieve projection of various images with a compact device.

BRIEF DESCRIPTION OF DRAWINGS

FIG. 26 is an illustrative diagram showing the driving patterns for the micro-vibration mirror and the polarization converting element in the image projecting device; and FIG. 27 is an illustrative diagram showing the positions of image projection by the driving patterns.

DESCRIPTION OF EMBODIMENTS

An embodiment of the present invention will be described below with reference to the accompanying drawings. To follow first is a description of the basic design that an image projecting device according to the invention presupposes, followed by a description of designs for projecting a stereoscopically viewable image and for projecting a high-definition image by pixel shifting.

(1. Overall Design)

Figure 1:
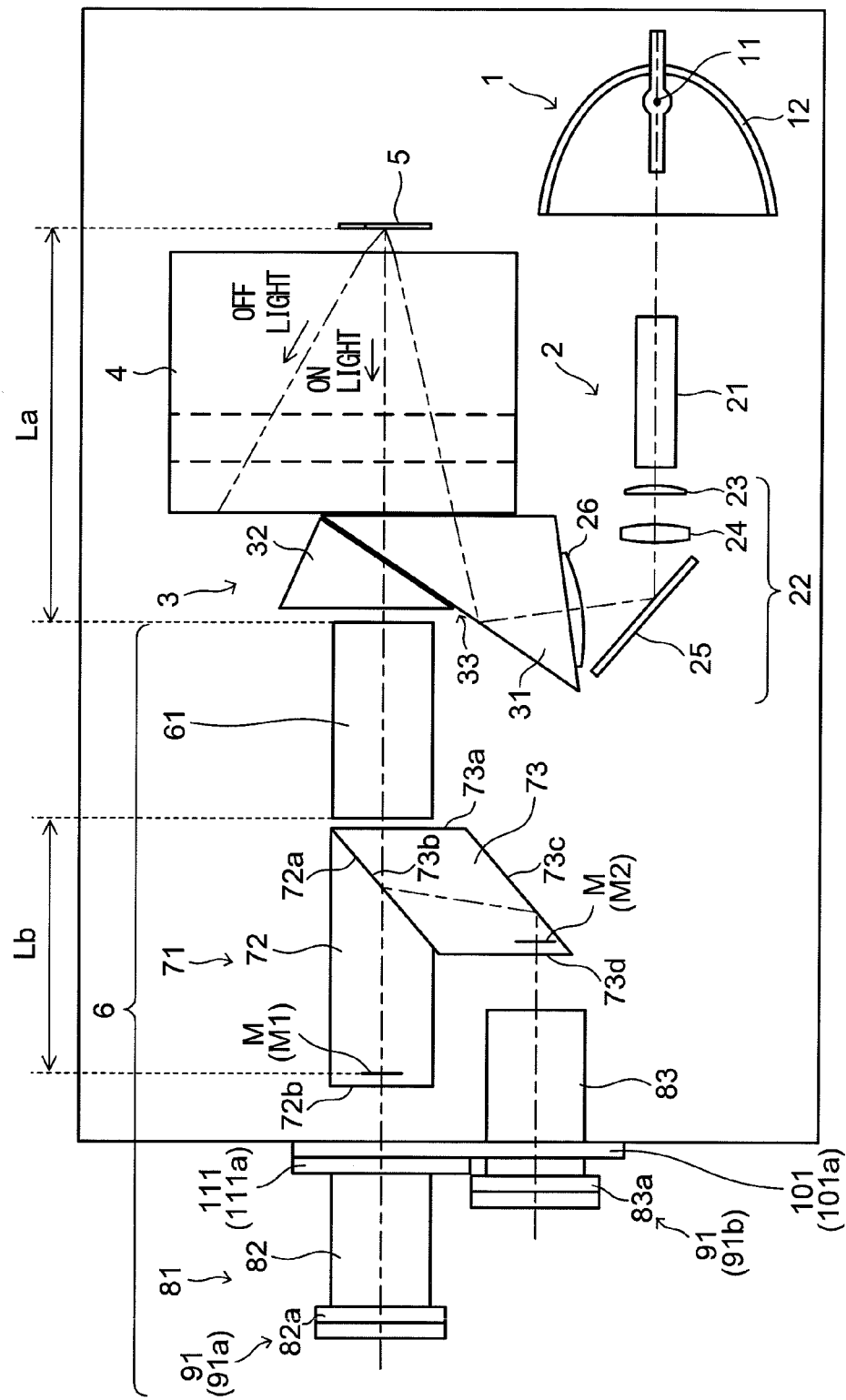
FIG. 1 is a sectional view schematically showing the basic design of an image projecting device embodying the invention.

FIG. 1 is a sectional view schematically showing the basic design of an image projecting device embodying the invention. The image projecting device includes a light source 1, an illumination optical system 2, a TIR prism 3, a dichroic prism 4, a DMD 5, and a projection optical system 6.

The light emitted from the light source 1 passes through the illumination optical system 2 and enters the TIR prism 3, where the light is totally reflected to enter the dichroic prism 4, where the light is split into different colors. The light of the different colors is modulated by corresponding DMDs 5 and then, as image light, enters the dichroic prism 4 once again. In the dichroic prism 4, the light of the different colors is integrated together. The light is then transmitted through the TIR prism 3, and is directed via the projection optical system 6 to a screen as a projection surface. Thus, the image displayed on the DMD 5 is projected on an enlarged scale onto the screen. The projection surface may be a wall. Each of the components will now be described in detail.

(2. Design of the Components Other than the Projection Optical System)

The light source 1 emits light for illuminating the DMD 5, and is composed of a light-emitting portion 11 and a reflector 12. The light-emitting portion 11 is composed of, for example, a xenon lamp that emits white light. The reflector 12 is a reflective plate that reflects the light emitted from the light-emitting portion 11 to direct it to the illumination optical system 2. The reflector 12 has a reflective surface in the shape of an ellipsoid of revolution, with the light-emitting portion 11 disposed at one of the focal points of the reflector 12. Thus, the light from the light-emitting portion 11 is reflected on the reflector 12 so as to focus at the other focal point, and then enters a rod integrator 21 in the illumination optical system 2.

The illumination optical system 2 is an optical system that directs the light from the light source 1 to the DMD 5, and is composed of a rod integrator 21 and an illumination relay system 22. The rod integrator 21 uniformizes the light amount distribution in the light from the light source 1 and then lets it outs. That is, the light that has entered the rod integrator 21 is internally reflected repeatedly to have a uniform light amount distribution and then emerges through the light-exit surface.

The illumination relay system 22 is an optical system that relays the image on the exit-surface of the rod integrator 21 to project it onto the DMD 5, thereby to illuminate the DMD 5 uniformly. The illumination relay system 22 is composed of lenses 23 and 24, a mirror 25, and an entrance lens 26. The lenses 23 and 24 condense the light from the rod integrator 21, and thereby improves the efficiency of use of the above light. The mirror 25 reflects the light that has been transmitted through the lenses 23 and 24 in this order to direct it to the entrance lens 26. The entrance lens 26 is a lens for illuminating the DMD 5 approximately telecentrically, and is disposed on the light-entrance side of the TIR prism 3. Instead of the entrance lens 26 being disposed, the light-entrance-side surface of the TIR prism 3 may be formed into a curved surface to function as the entrance lens 26.

The TIR prism 3 is a total-reflection prism (critical-angle prism) having two prisms 31 and 32 joined together with an air gap between them, and the surfaces at which they are joined together serves as a critical surface 33 at which the illumination light fulfills the total reflection conditions. Accordingly, the light from the illumination optical system 2 is totally reflected on the critical surface 33 so as to be directed via the dichroic prism 4 to the DMD 5. On the other hand, the image light from the DMD 5 does not fulfill the total reflection conditions, and is thus transmitted through the critical surface 33 so as to be directed via the projection optical system 6 to the screen. The TIR prism 3 may instead be so designed as to, on one hand, direct the illumination light to the DMD 5 by transmitting it and, on the other hand, directs the image light from the DMD 5 to the projection optical system 6 by totally reflecting it.

Figure 2:
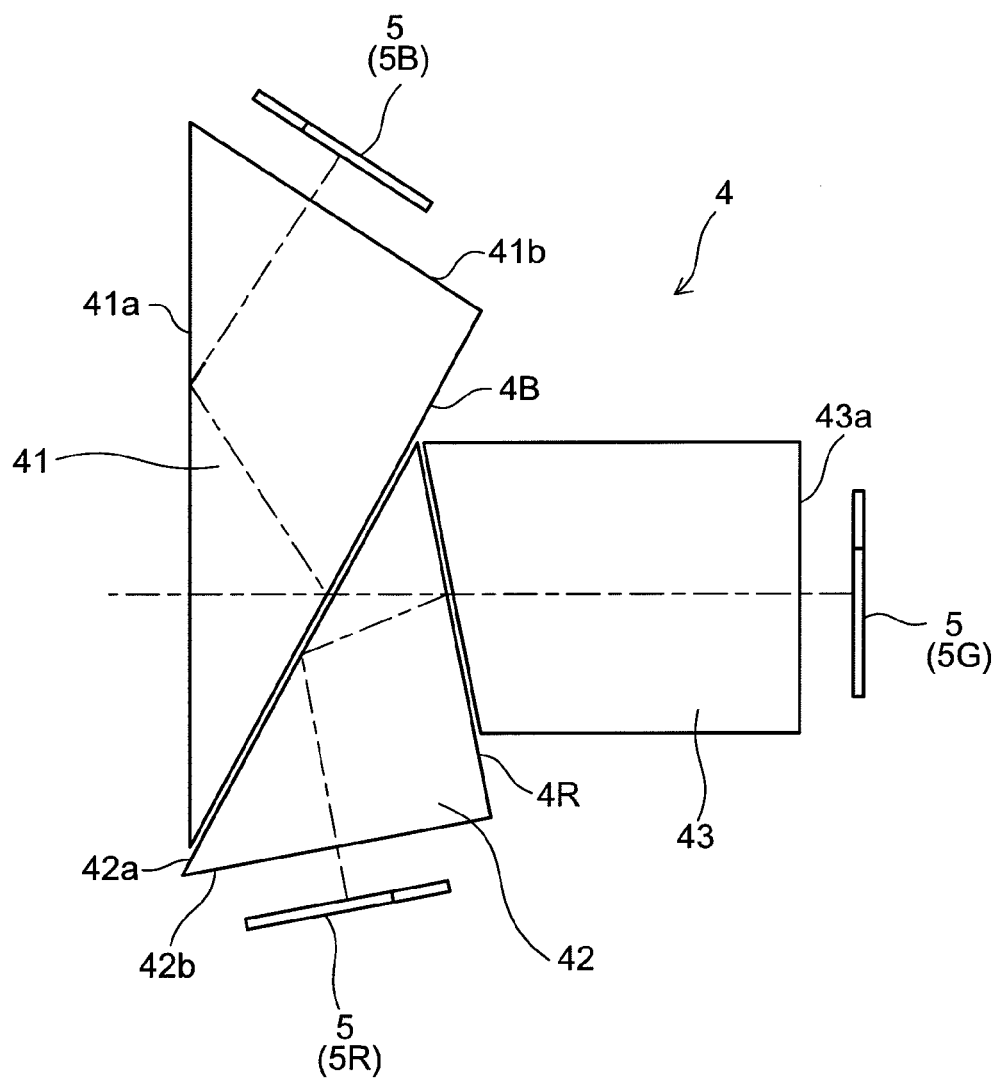
FIG. 2 is a sectional view showing an outline of the design of the dichroic prism in the image projecting device.

The dichroic prism 4, on one hand, splits the illumination light that enters it via the TIR prism 3 into different colors (by either transmitting or reflecting the light depending on wavelength) to direct it to corresponding DMDs 5 (comprising DMDs 5R, 5G, and 5B described later) and, on the other hand, integrates together the colored light (image light) from those DMDs 5 to direct it to the TIR prism 3. FIG. 2 is a sectional view showing an outline of the design of the dichroic prism 4. The dichroic prism 4 has three prisms 41, 42, and 43, the prisms 41 and 42 being joined together with an air gap between them, the prisms 42 and 43 being joined together with an air gap between them.

Of the illumination light that has entered the prism 41 through the surface 41a, blue light is reflected on the dichroic surface 4B of the prism 41, is then totally reflected on the surface 41a, and then exits through the surface 41b to illuminate a blue DMD 5B; the light of the other colors (green and red light) is transmitted through the dichroic surface 4B to enter the prism 42. Of this light, red light is reflected on the dichroic surface 4R of the prism 42, is then totally reflected on the critical surface 42a (the surface opposite the dichroic surface 4B across an air gap), and then exits through the surface 42b to illuminate a red DMD 5R; green light is transmitted through the dichroic surface 4R to enter the prism 43, and then exits through the surface 43a to illuminate a green DMD 5G.

Red image light (projection light) modulated by the red DMD 5R and reflected on the relevant mirrors enters the prism 42 through the surface 42b, is then totally reflected on the critical surface 42a, and is then reflected on the dichroic surface 4R. Green image light modulated by the green DMD 5G and reflected on the relevant mirrors enters the prism 43 through the surface 43a, is then transmitted through the dichroic surface 4R of the prism 42, is thus integrated with the red image light to have the same optical axis, and is then transmitted through the dichroic surface 4B of the prism 41. Blue image light modulated by the blue DMD 5B and reflected on the relevant mirrors enters the prism 41 through the surface 41b, is then totally reflected on the surface 41a, is then reflected on the dichroic surface 4B, is thus integrated with the red and green image light to have the same optical axis, and then enters the TIR prism 3. The image light of the different colors that has entered the TIR prism 3 is then, as described above, transmitted through the critical surface 33 so as to be directed via the projection optical system 6 to the screen.

The DMD 5 is a digital micromirror device (manufactured by Texas Instruments Incorporated, USA) that has a plurality of minuscule mirrors, corresponding to pixels, arranged in a matrix-like formation, and serves as a display element that modulates incident light to display an image. In the embodiment under discussion, the DMD 5 is composed of three DMDs 5R, 5G, and 5B that modulate illumination light for each of red, green, and blue respectively. Each mirror of the DMD 5 behaves in the following manner: in a state inclined 12 degrees toward the illumination optical axis, it reflects the illumination light so as to emit on-light, as projection light, in a direction perpendicular to the image display region of the DMD 5; in a state inclined 12 degrees in the opposite direction, it reflects the illumination light so as to emit off-light with an emergence angle of 48 degrees. Whereas the on-light is directed via the dichroic prism 4, the TIR prism 3, and the projection optical system 6 in this order to the screen, the off-light, since it is emitted from the mirror with a large emergence angle, does not enter the projection optical system 6 and thus does not reach the screen. In this way, by controlling the inclination of each mirror on a binary basis between on and off, it is possible to display an image on the DMD 5 and project the displayed image onto the screen.

(3. Design of the Projection Optical System)

Next, with reference to FIG. 1 etc., the design of the projection optical system 6 will be described. The projection optical system 6 is an optical system that directs the image light from the DMD 5 to the screen, and comprises a relay optical system 61, a PBS prism 71, a projection lens 81, a zoom mechanism 91, a shift mechanism 101, and a correction mechanism 111.

(3-1. Relay Optical System)

The relay optical system 61 is an optical system that relays the image light from the DMD 5 to form an intermediary image M of the display image on the DMD 5. More specifically, the relay optical system 61 images the color-integrated display image on the DMD 5 at a relaying magnification of ×2 to form the intermediary image M. With the relaying magnification set at ×2, the display image on the DMD 5 which is a light beam with an f-number of, for example, 2.5 is formed into an intermediary image M which is a light beam with an f-number of 5.

The display image on the DMD 5 has an approximately telecentric beam distribution, and the relay optical system 61 is so designed that the intermediary image M also has an approximately telecentric beam distribution. Thus, the relay optical system 61 is telecentric both to the DMD 5 side and to the intermediary image (screen) side.

As a result of the relay optical system 61 being approximately telecentric to the intermediary image side, the angle of the principal ray entering the PBS prism 71 is the same irrespective of the image position (image height), and this reduces the variation of the incidence angle of the light entering the PBS prism 71 from the relay optical system 61. This improves polarization splitting efficiency in the PBS prism 71, and also, by making the PBS characteristic identical for rays at different image positions, helps suppress uneven brightness and uneven color.

In a case where the relay optical system 61 is telecentric both to the DMD 5 side and to the intermediary image side, let the absolute value of the magnification of the relay optical system 61 be $\beta$, let the equivalent aerial distance from the entrance surface of the most DMD 5—side lens (corresponding to lens L31 in FIG. 8) in the relay optical system 61 to the display element surface of the DMD 5 be La (mm), and let the equivalent aerial distance from the exit surface of the most screen-side lens (corresponding to lens L21 in FIG. 8) in the relay optical system 61 to the intermediary image M be Lb (mm), then it is preferable that the formula $$\beta/3 < Lb/La < \beta$$

be fulfilled. The reasons are as follows.

Consider a system that has two ideal positive lenses (with focal lengths of f1 and f2) arranged at a distance of (f1+f2) from each other and that is telecentric to both sides. Then, the distance from each lens to the imaging surface equals the focal length of that lens (Lb/La=$\beta$). In reality, the relationship is broken by image-surface curvature correction and chromatic aberration correction, but even then, to obtain a well-balanced, higher-performance optical system, it is preferable that the above relationship of distances be observed as closely as possible. By setting Lb/La greater than $\beta$/3, it is possible to realize a well-balanced, high-performance relay optical system 61. Setting Lb/La excessively great, however, increases the total lens length, and is therefore disadvantageous in terms of both cost and size. By setting Lb/La smaller than $\beta$, it is possible to reduce the cost and size of the relay optical system 61. In this connection, the embodiment under discussion, where β=2, La=81.0, Lb=98.7, and Lb/La=1.22, fulfills the above conditional formula.

Let the absolute value of the magnification of the relay optical system 61 be β, then it is preferable that the formula $$1 < \beta < 3$$

be fulfilled. By setting β greater than 1, it is possible to reduce the variation of the incidence angle of the light entering the PBS prism 71 from the relay optical system 61. Thus, it is possible to improve the polarization splitting efficiency in the PBS prism 71, and to suppress uneven brightness. By setting smaller than β, it is possible to prevent the image circle diameter of the projection lens 81, and hence the lens diameter of the projection lens 81, from becoming excessively great. In this connection, the embodiment under discussion, where β=2, fulfills the above conditional formula.

(3-2. PBS Prism)

The PBS prism 71 is a polarization splitting element that splits the light emerging from the relay optical system 61 into two linearly polarized light components (P-polarized light and S-polarized light) that are polarized in mutually perpendicular directions, and thereby forms two of the intermediary images M mentioned above. In the following description, wherever distinction is needed between the two intermediary images M, the intermediary image M of P-polarized light is referred to as the intermediary image M1 and the intermediary image M of S-polarized light is referred to as the intermediary image M2.

The PBS prism 71 is composed of two prism members comprising a first prism 72 and a second prism 73, that are joined together with a PBS film (polarization splitting film) between them. The second prism 73 has four optical surfaces, namely an entrance surface 73a, a PBS surface (a surface on which the PBS film mentioned above is formed) 73b, a total reflection surface 73c, and an exit surface 73d. The entrance surface 73a and the PBS surface 73b form an angle of, for example, 49.5 degrees. The entrance surface 73a and the exit surface 73d are parallel to each other, and the PBS surface 73b and the total reflection surface 73c are parallel to each other.

The first prism 72 has two optical surfaces, namely a junction surface 72a and an exit surface 72b. The junction surface 72a and the exit surface 72b form an angle of, for example, 49.5 degrees. The PBS surface 73b of the second prism 73 and the junction surface 72a of the first prism 72 are joined together with adhesive so that the entrance surface 73a of the second prism 73 and the exit surface 72b of the first prism 72 are parallel to each other.

With this design, the light beam from the relay optical system 61 enters the second prism 73 through the entrance surface 73a, and is then split into P-polarized light and S-polarized light at the PBS surface 73b. Of these lights, the P-polarized light is transmitted through the PBS surface 73b, so that it then, via the adhesive layer, strikes and passes straight through the junction surface 72a of the first prism 72, and eventually exits through the exit surface 72b. Meanwhile the intermediary image M1 of P-polarized light is formed near the exit surface 72b inside the first prism 72.

On the other hand, the S-polarized light is reflected on the PBS surface 73b, then reaches and is totally reflected on the total reflection surface 73c of the second prism 73, and eventually exits through the exit surface 73d. Meanwhile, the intermediary image M2 of S-polarized light is formed near the exit surface 73d inside the second prism 73.

The beams of P- and S-polarized light emerging from the PBS prism 71 are parallel to each other; the imaging positions of their respective intermediary images M1 and M2 are apart from each other by, for example, 85 mm in the direction of polarization splitting, and are also apart from each other by, for example, about 72.6 mm in the optical axis direction of the relay optical system 61. The intermediary images M1 and M2 are formed inside the first and second prisms 72 and 73 respectively, and are thus not located at an interface; this prevents dust on an intermediary image surface from being imaged on the screen.

Next, the material of the PBS prism 71 (the first and second prisms 72 and 73) will be described.

Figure 3:
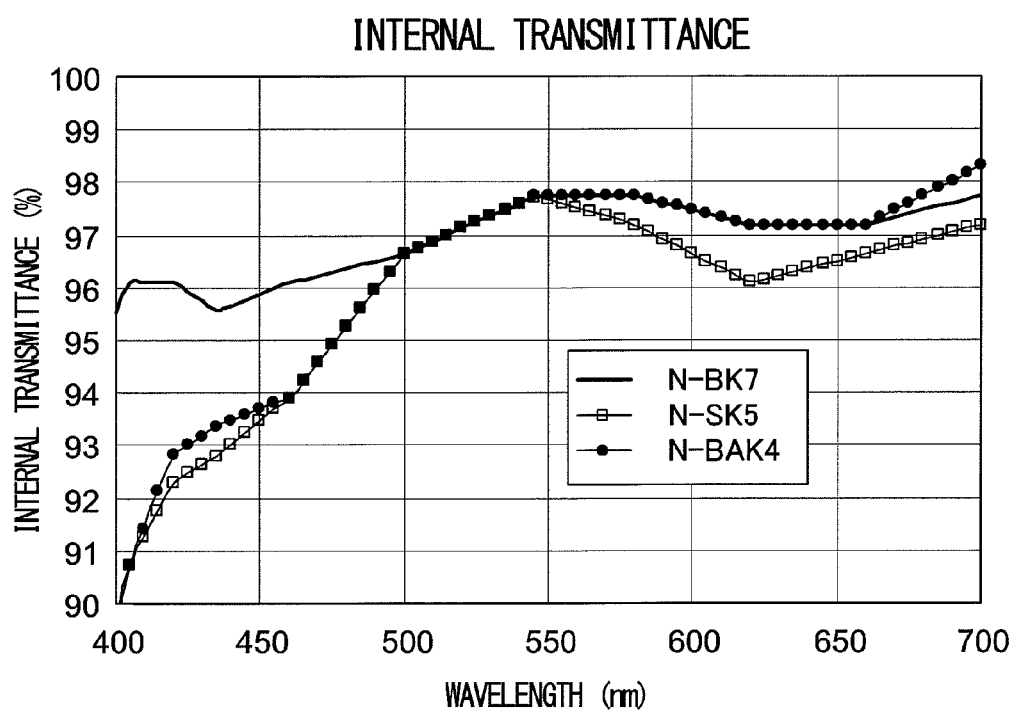
FIG. 3 is a graph showing the results of a simulation of the internal transmittance of the PBS prism in the projection optical system in the image projecting device.

The PBS prism 71 used in the embodiment under discussion has a total length as large as, for example, 142 mm, and thus the internal transmittance of glass affects greatly. Among the glass materials manufactured by SCHOTT, the product with the designations N-BK7, N-BAK4, and N-SK5, among others, have high internal transmittance. FIG. 3 shows the results of a simulation of the internal transmittance of a 142 mm long PBS prism 71, for each of the just-mentioned materials. FIG. 3 reveals that N-BK7, having higher transmittance than the other two, is preferable as the material of the PBS prism 71.

Having a total length of 142 mm, the PBS prism 71 has a considerably large weight. N-BK7 has a specific gravity of 2.51, N-BAK4 3.05, and N-SK5 3.30. Also in this respect, it is preferable to use N-BK7, having the smallest specific gravity, as the material of the PBS prism 71. Also in terms of cost, considering that N-BAK4 and N-SK5 are 1.5 times more expensive than N-BK7, it is preferable to use N-BK7 as the material of the PBS prism 71.

Out of the above considerations, in the embodiment under discussion, N-BK7 having a refractive index of 1.517 is used as the material of both the first and second prisms 72 and 73 of the PBS prism 71.

Next, the design of the PBS film mentioned above will be described.

The PBS film is composed of a total of 37 low- and high-refractive-index layers stacked alternately together. The low-refractive-index layers are made of $SiO_2$ having a refractive index of 1.474 to 1.475 and are formed by IAD (ion-assisted deposition). On the other hand, the high-refractive-index layers are made of a mixed material of $Al_2O_3$ and $La_2O_3$ (for example, Substance M3 manufactured by Merck) and are formed by IAD. The reasons that those particular materials and that particular number of layers have been chosen will be described later. Table 1 shows the design of the PBS film (material, thickness (in μm)).

TABLE 1

| Layer Number | Material | Thickness (μm) |
| --- | --- | --- |
| — | N-BK7 | 0.00 |
| 1 | Substance M3 | 151.47 |
| 2 | $SiO_2$ | 216.90 |
| 3 | Substance M3 | 132.85 |
| 4 | $SiO_2$ | 193.71 |
| 5 | Substance M3 | 131.29 |
| 6 | $SiO_2$ | 167.09 |
| 7 | Substance M3 | 131.79 |
| 8 | $SiO_2$ | 160.24 |
| 9 | Substance M3 | 113.48 |
| 10 | $SiO_2$ | 177.39 |
| 11 | Substance M3 | 102.60 |
| 12 | $SiO_2$ | 152.10 |
| 13 | Substance M3 | 108.57 |
| 14 | $SiO_2$ | 152.91 |
| 15 | Substance M3 | 85.14 |
| 16 | $SiO_2$ | 129.65 |
| 17 | Substance M3 | 108.26 |
| 18 | $SiO_2$ | 138.25 |
| 19 | Substance M3 | 86.35 |

TABLE 1-continued

| Layer Number | Material | Thickness (μm) |
|---|---|---|
| 20 | SiO$_2$ | 139.49 |
| 21 | Substance M3 | 63.37 |
| 22 | SiO$_2$ | 148.51 |
| 23 | Substance M3 | 62.17 |
| 24 | SiO$_2$ | 157.07 |
| 25 | Substance M3 | 47.67 |
| 26 | SiO$_2$ | 158.05 |
| 27 | Substance M3 | 48.27 |
| 28 | SiO$_2$ | 145.90 |
| 29 | Substance M3 | 52.56 |
| 30 | SiO$_2$ | 119.85 |
| 31 | Substance M3 | 59.46 |
| 32 | SiO$_2$ | 111.37 |
| 33 | Substance M3 | 58.99 |
| 34 | SiO$_2$ | 104.60 |
| 35 | Substance M3 | 58.22 |
| 36 | SiO$_2$ | 88.64 |
| 37 | Substance M3 | 33.93 |
| — | N-BK7 | |

Figure 4:
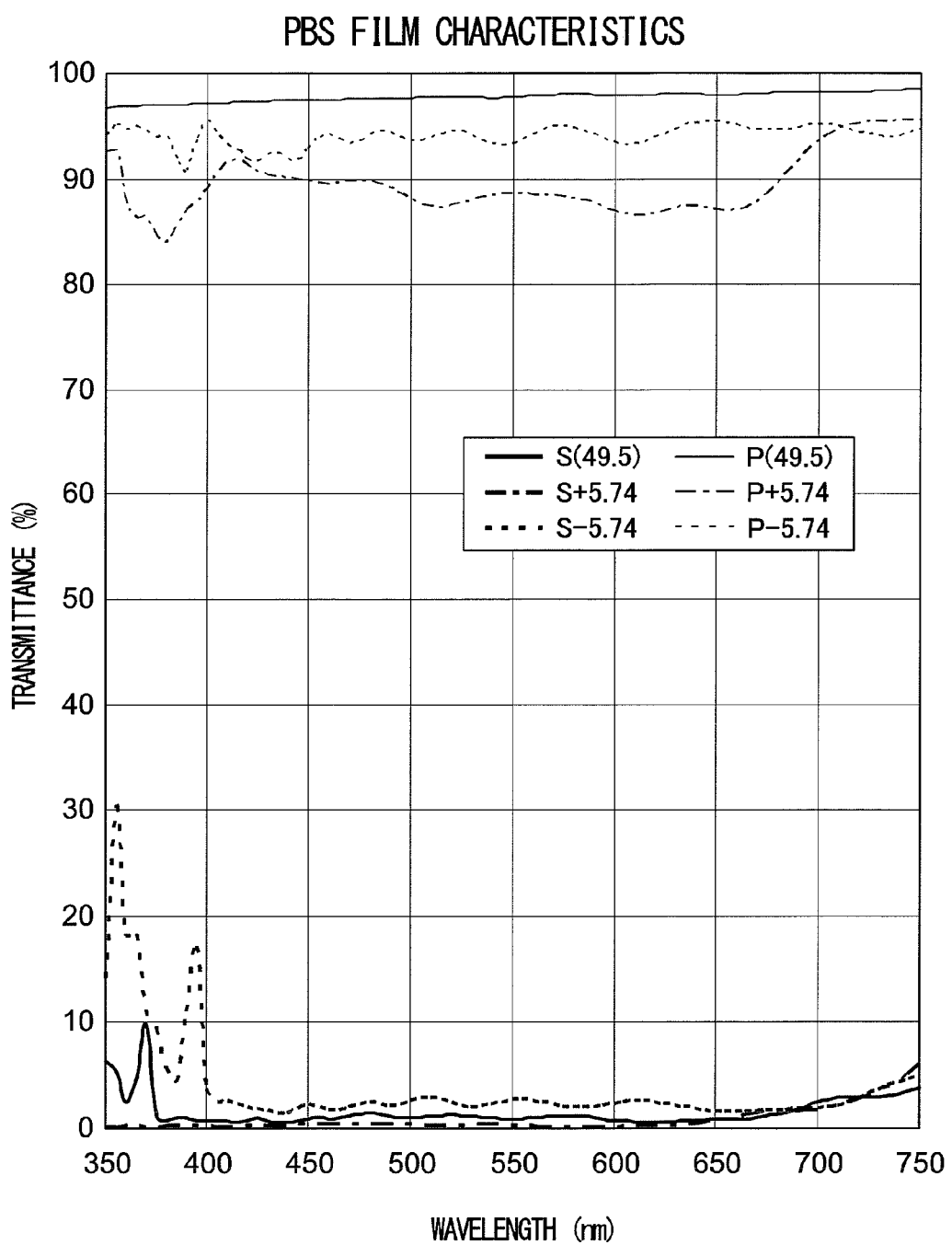
FIG. 4 is a graph showing the variation of the characteristics of the PBS film versus the variation of the incidence angle in the PBS prism.

FIG. 4 shows the characteristics (transmittance) of the PBS film when the incidence angle to the PBS film is 49.5 degrees and how the characteristics vary when the incidence angle is varied by the amounts (for example ±5.74 degrees) equivalent to an f-number of 5. As described above, the PBS film is a multiple-layer film comprising alternating low- and high-refractive-index layers; its characteristics thus vary with incidence angle. However, since, as described above, the relay optical system 61 narrows the angle range of the light beam from an f-number of 2.5 to an f-number of 5 to achieve approximate telecentricity, it is possible, as shown in FIG. 4, to suppress the variation of the characteristics with the incidence angle to the PBS film; thus, it is possible to perform polarization splitting efficiently at the PBS film.

From the viewpoint of laying out the PBS prism 71 compactly, it is preferable to set the angle of the PBS surface 73$b$ with respect to the entrance surface 73$a$ at 45 degrees. In a PBS film having low- and high-refractive-index layers stacked alternately, however, let the refractive index of the low-refractive-index layers be L, the refractive index of the high-refractive-index layers be H, and the refractive index of glass be G, and the incidence angle of light to the exit surface 73$b$ be θ (degrees), then the Brewster angle condition makes it necessary to fulfill the following condition:

$$G^* \sin \eta = H^* L/(H^2+L^2)^{-2}.$$

Here, a high ratio (H/L) between the refractive indices H and L makes it possible to form the PBS film out of a small number of layers. However, using N-BK7 mentioned above as the material for the first and second prisms 72 and 73 and giving the PBS film a high refractive index ratio leads to a condition involving a larger incidence angle, resulting in a large prism size.

In contrast, the smaller L is, the higher the refractive index ratio can be made under the same incidence angle condition. An example of such a low-refractive-index material is MgF with a refractive index of 1.385; however, with consideration given to flexibility in film formation and to quality such as reliability of the resulting multiple-layer film, in the embodiment under discussion, SiO$_2$ with a refractive index of 1.474 to 1.474 is chosen. On the other hand, as a high-refractive-index material, with consideration given to incidence angle and the number of layers, a mixed material of Al$_2$O$_3$ and La$_2$O$_3$ (for example, Substance M3 manufactured by Merck) with a refractive index of 1.84 is chosen, with the incidence angle set at 49.5 degrees and the number of layers 37.

The greater the number of layers, the higher the reflectance for S-polarized light can be made while the transmittance for P-polarized light fulfilling the Brewster angle condition is kept unchanged; in contrast, the transmittance for P-polarized light off the Brewster angle condition decreases the greater the number of layers.

In the embodiment under discussion, the PBS prism 71 is given slightly suppressed S-polarized light reflectance for efficient polarization splitting between P- and S-polarized lights across the entire cone-shaped angle distribution of an f-number of 5, and is given a somewhat small number of layers for satisfactory P-polarized light transmittance across the entire spectrum. Specifically, the S-polarized light reflectance at the incidence angle fulfilling the Brewster angle condition is set not very high, namely between 94% and 99% in the wavelength range between 400 nm to 700 nm.

In the embodiment under discussion, the PBS prism 71 is disposed between the relay optical system 61 and the projection optical system 6, with the result that two intermediary images M1 and M2 are formed. The intermediary images M1 and M2 are formed by the same relay optical system 61, and thus have the identical shape even with distortion taken into account.

(3-3. Projection Lens)

As shown in FIG. 1, the projection lens 81 is composed of two projection lenses, namely a first projection lens 82 and a second projection lens 83, which respectively project the two intermediary images M1 and M2 formed at the PBS prism 71 on an enlarged scale so that they are substantially overlaid together on a screen. The first projection lens 82 is so disposed as to project the intermediary image M1 of P-polarized light onto the screen, and the second projection lens 83 is so disposed as to project the intermediary image M2 of S-polarized light onto the screen. The first and second projection lenses 82 and 83 are arranged with their optical axes parallel to each other.

(3-4. Zoom Mechanism, Shift Mechanism, and Correction Mechanism)

The zoom mechanism 91 varies the projection magnification of the projection lens 81. More specifically, the zoom mechanism 91 is composed of a zoom mechanism 91$a$ which varies the projection magnification of the first projection lens 82 and a zoom mechanism 91$b$ which varies the projection magnification of the second projection lens 83. In the embodiment under discussion, the projection lenses 81 are each provided with a zoom mechanism 91; instead, only one of the projection lenses 81 may be provided with a zoom mechanism 91.

The zoom mechanism 91$a$ includes a zoom ring 82$a$ provided on the first projection lens 82 and an entire drive mechanism which, as the zoom ring 82$a$ is rotated, moves part of the lenses within the first projection lens 82 along the optical axis. Likewise, the zoom mechanism 91$b$ includes a zoom ring 83$a$ provided on the second projection lens 83 and an entire drive mechanism which, as the zoom ring 83$a$ is rotated, moves part of the lenses within the first projection lens 83 along the optical axis. Thus, the first and second projection lenses 82 and 83 can each be said to be composed of a zoom lens whose magnification can be varied by rotation of the zoom ring 82$a$ or 83$a$.

The shift mechanism 101 shifts, in the up-down and left-right directions, the projection position (projection frame position) of the two projection lenses (the first and second projection lenses 82 and 83) on the screen. In the embodiment under discussion, the shift mechanism 101 is composed of a first mount portion 101$a$ provided on the body of the device. The first projection lens 82 is attached, via a second mount portion 111*a*, which will be described later, to the first mount portion 101*a*. The second projection lens 83 is attached directly to the first mount portion 101*a*.

Figure 5:
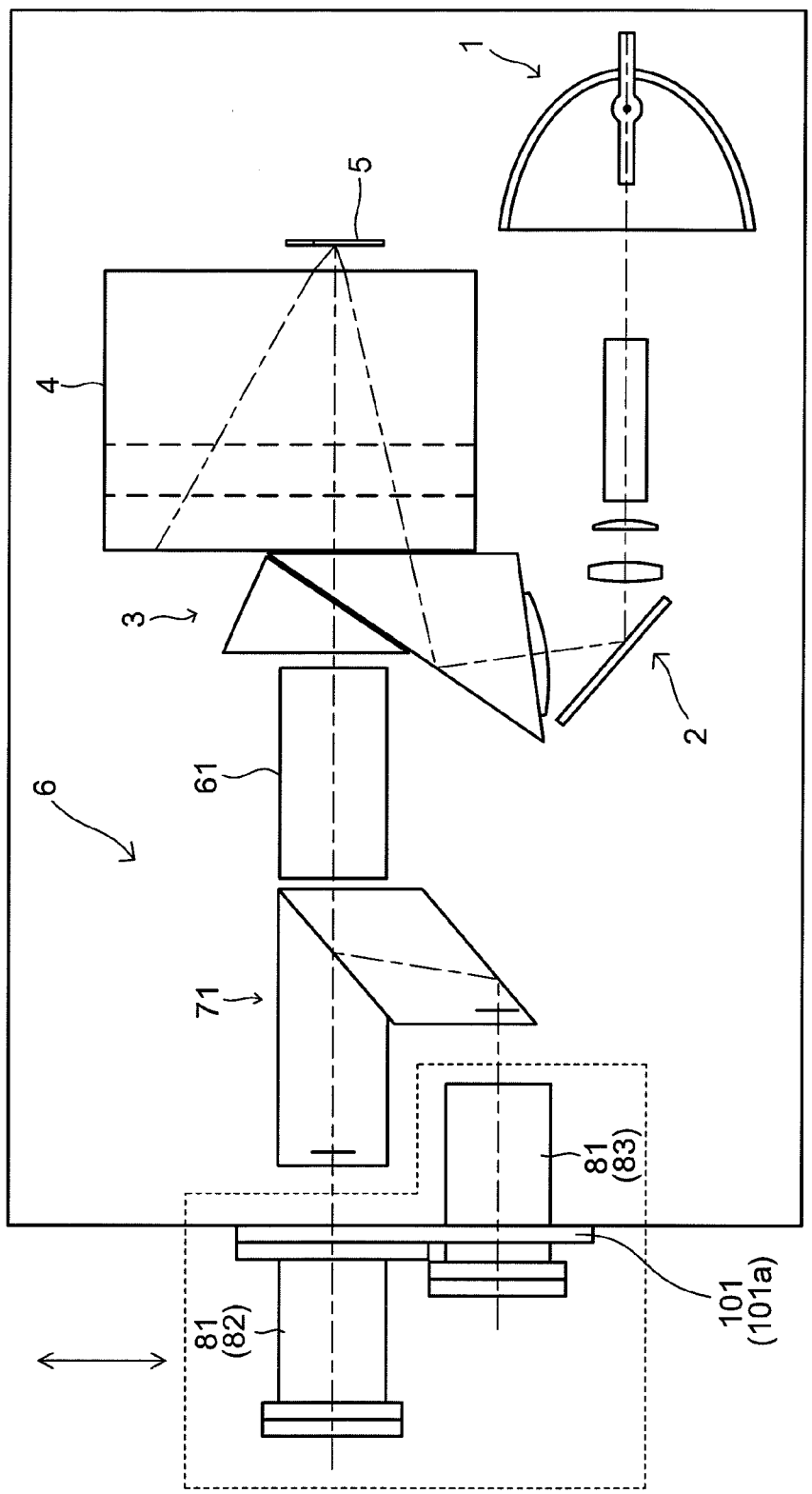
FIG. 5 is an illustrative diagram showing an example of shifting by the shift mechanism in the projection optical system.
Figure 6:
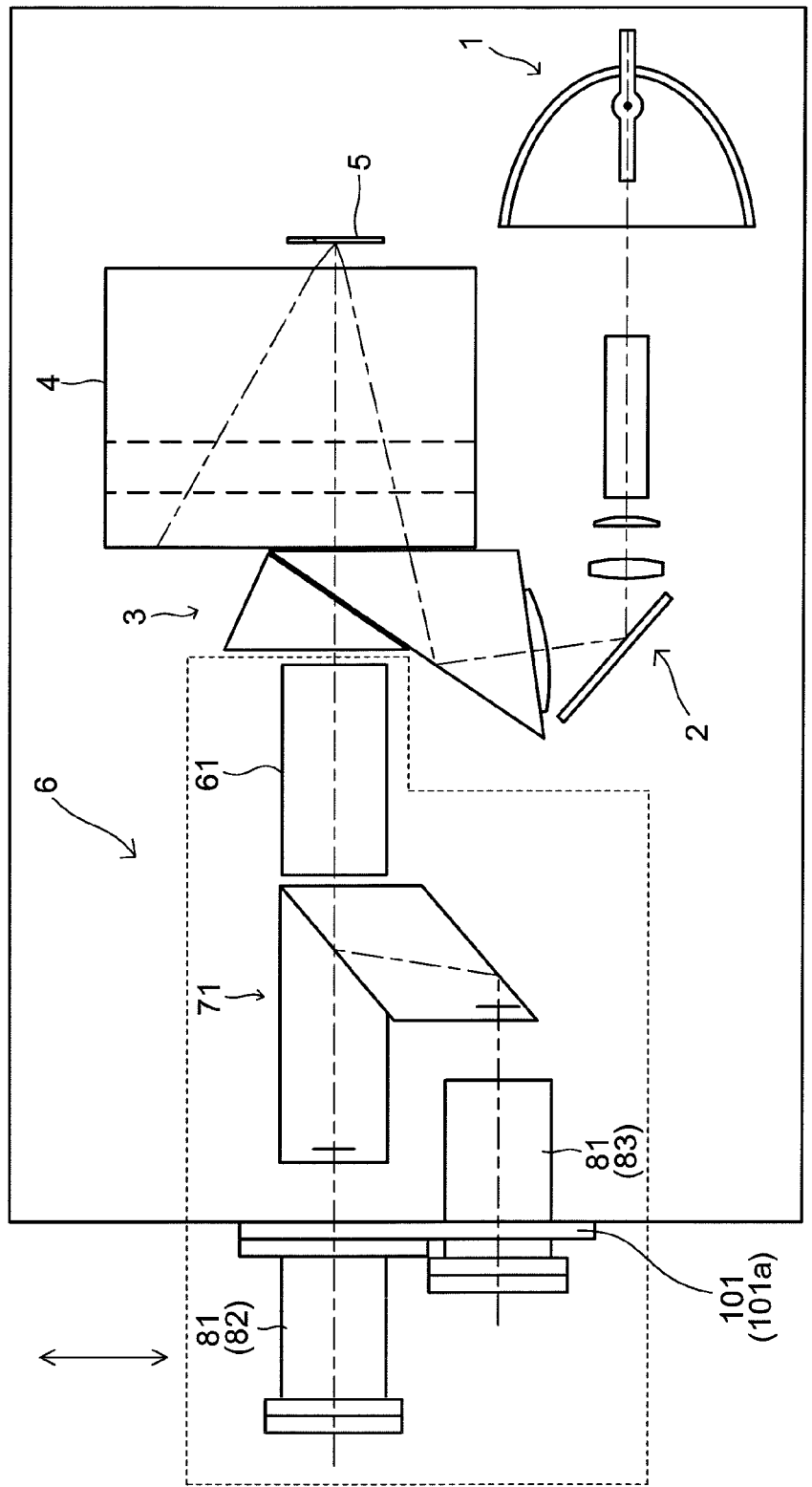
FIG. 6 is an illustrative diagram showing another example of shifting by the shift mechanism in the projection optical system.

The first mount portion 101*a* constitutes a first shift mechanism which moves the two projection lenses 81 together parallel to the display surface of the DMD 5. Here, the first mount portion 101*a* may, as shown in FIG. 5, move the two projection lenses 81 together parallel while the relay optical system 61 is kept stationary, or may, as shown in FIG. 6, move the two projection lenses 81 together along with the relay optical system 61 parallel to the display surface of the DMD 5.

The correction mechanism 111 corrects the relative deviation in position between the two projection images by the two projection lenses 81 (the first and second projection lenses 82 and 83) on the screen, and is composed of, in the embodiment under discussion, a second mount portion 111*a* provided on the first mount portion 101*a* mentioned above. The second mount portion 111*a* holds the first projection lens 82, and permits the first projection lens 82 to move parallel to the display surface of the DMD 5.

Another second mount portion corresponding to the second projection lens 83 may be provided separately on the first mount portion 101*a* so that the first and second projection lenses 82 and 83 are held by separate second mount portions. The second mount portion 111*a* may move the first projection lens 82 parallel while the relay optical system 61 is kept stationary, or may move the first projection lens 82 along with the relay optical system 61 parallel to the display surface of the DMD 5.

Figure 7:
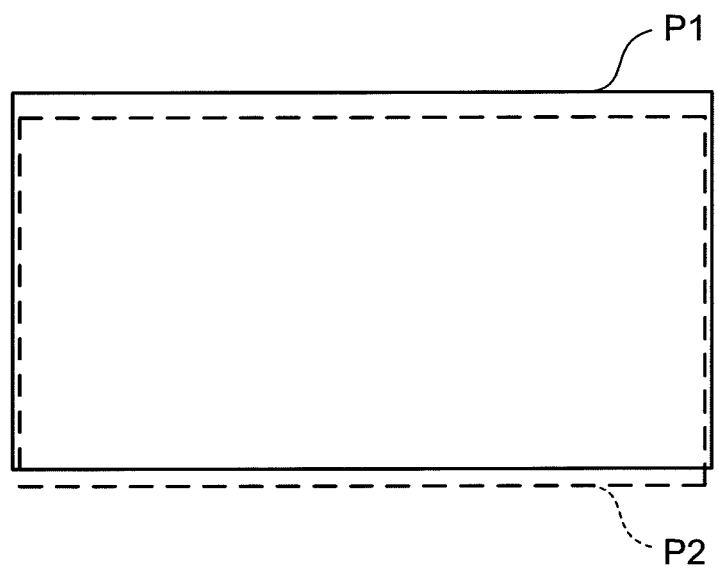
FIG. 7 is an illustrative diagram schematically showing the projection positions, on the projection surface, of the projection images by the two projection lenses in the projection optical system.

With the zoom mechanism 91, the shift mechanism 101, and the correction mechanism 111, setting proceeds as follows. First, the first mount portion 101*a* of the shift mechanism 101 is operated to move both the projection lenses 81 simultaneously in the up-down and left-right directions perpendicular to the optical axis of the relay optical system 61 (parallel to the display element surface). FIG. 7 schematically shows the projection position on the screen of the projection image P1 (intermediary image M1) by the first projection lens 82 and the projection image P2 (intermediary image M2) by the second projection lens 83. With the projection image P2 by the second projection lens 83 taken as a reference for adjusting the projection position and projection size, the first mount portion 101*a* and the zoom ring 83*a* of the second projection lens 83 are operated to determine the projection position and projection size of the projection image P2 by the second projection lens 83 on the screen.

Next, the second mount portion 111*a* of the correction mechanism 111 is operated to move the first projection lens 82 in the up-down and left-right directions perpendicular to the optical axis of the relay optical system 61, so as thereby to adjust the projection image P1 by the first projection lens 82 to the projection position of the projection image P2 by the second projection lens 83. Then, the zoom ring 82*a* of the first projection lens 82 is operated to adjust the size of the projection image P1 by the first projection lens 82 to the size of the projection image P2 by the second projection lens 83. In this way, the two projection images P1 and P2 can be overlaid together neatly.

As described above, in the embodiment under discussion, the correction mechanism 111 (second mount portion 111*a*) and the zoom mechanism 91 are provided at least one of the two projection lenses 81. Thus, even in a case where a deviation (distance) between the optical axes of the two projection lenses 81 and a difference between their projection distances result in a difference in projection position and size between the projection images P1 and P2 by the two projection lenses 81, through the correction by the correction mechanism 111 of the deviation between the positions of the projection images P1 and P2 and the varying by the zoom mechanism 91 of the projection magnification of the projection lenses 81, it is possible to overlay the two projection images P1 and P2 together in substantially the same position and with substantially the same size on the screen.

Since the shift mechanism 101 (first mount portion 101*a*) shifts the two projection lenses 81 together, with a single operation of the shift mechanism 101, the projection positions of the projection images P1 and P2 by the two projection lenses 81 on the screen can be moved simultaneously. This allows easy setting of the projection position. Whereas adjustment between relative frame positions (correction of a deviation between the positions of the two projection images), which demands accuracy, is performed with the correction mechanism 111, frame shifting on the screen (shifting of the projection position) is performed with the shift mechanism 101; assigning different functions to different members in this way helps increase the movement stroke covered by the operation of the shift mechanism 101, and thus helps improve ease of operation.

Here, with a design as shown in FIG. 5 where the shift mechanism 101 moves the two projection lenses 81 parallel to the display surface of the DMD 5 while the relay optical system 61 is kept stationary, no offsetting of the relay optical system 61 is necessary (the relay optical system 61 does not need to be shifted), and thus it is possible to realize a compact relay optical system 61 with a small image circle diameter.

On the other hand, with the design in which the two projection lenses 81 are moved parallel to the display surface of the DMD 5 while the relay optical system 61 is kept stationary, high imaging performance is needed in the formation of the intermediary image M by the relay optical system 61, and this may impose a burden on the design of the projection optical system 6. Accordingly in a case where alleviation of such a design burden needs to be given priority, a design as shown in FIG. 6 may be adopted where the shift mechanism 101 moves the two projection lenses 81 along with the relay optical system 61 parallel to the display surface of the DMD 5. With this design, no high imaging performance is needed in the formation of the intermediary image M, and this increases flexibility in the design of the projection optical system 6; it is thus possible, for example, to reduce the number of lenses of the projection lenses 81 and thereby achieve cost reduction.

Even with the design where the shift mechanism 101 moves one of the two projection lenses 81 along with the relay optical system 61 parallel to the display surface of the DMD 5, it is possible to obtain the above-mentioned benefit of cost reduction. Thus, so long as the shift mechanism 101 constitutes a mechanism (second shift mechanism) that moves at least one of the projection lenses 81 along with the relay optical system 61 parallel to the display surface of the DMD 5, it is possible to achieve the above-mentioned benefits.

(3-5. Another Example of the Design of the Correction Mechanism)

The correction mechanism 111 (second mount portion 111*a*) mentioned above may instead be so designed as to correct the relative deviation in position between the two projection images on the screen not by shifting the entire projection lens 81 (decentering it with respect to the optical axis of the relay optical system 61) but by decentering part of the lenses within the projection lens 81. This will be discussed below.

Figure 8:
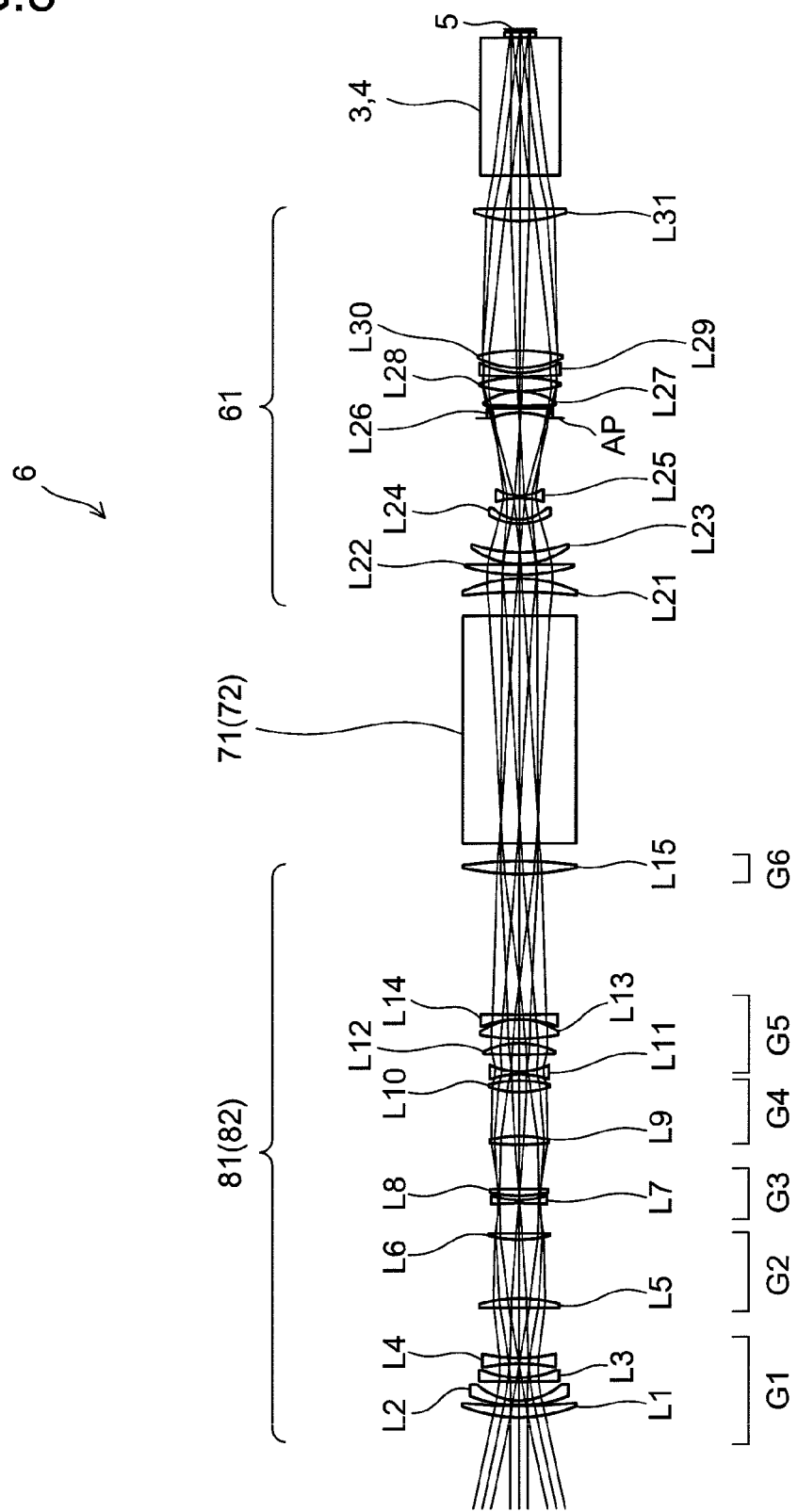
FIG. 8 is a sectional view showing the detailed design of the projection optical system.

For example, FIG. 8 is a sectional view showing the detailed design of the projection optical system 6 shown in FIG. 1 etc. In FIG. 8, the members preceding the DMD 5, such as the light source 1 and the illumination optical system 2, are omitted from illustration. Also, the second projection lens 83, since it has a similar design to the first projection lens 82, is omitted from illustration.

The projection lens 81 is composed of six lens groups, namely a first to a sixth group G1 to G6 from the screen side. The first group G1 is composed of four lenses L1 to L4 from the screen side. The second group G2 is composed of two lenses L5 and L6 from the screen side. The third group G3 is composed of two lenses L7 and L8 from the screen side. The fourth group G4 is composed of two lenses L9 and L10 from the screen side. The fifth group G5 is composed of four lenses L11 to L14 from the screen side. The sixth group G6 is composed of one lens L15. The relay optical system 61 is composed of 11 lenses L21 to L31 from the screen side.

In a case where part of the lenses within the projection lens 81 are decentered, such a lens (or lens group) needs to be decentered as can be decentered with little variation in aberrations but with a change in projection position. A lens (or lens group) suitably decentered differs depending on lens type (focal length, optical power arrangement, etc.), and within the projection lens 81, considered to be such a lens is, for example, at least one of the negative lenses (lenses L2 and L3) in the first group G1, the positive lens (L9) in the fourth group G4, and the positive lens (L12) in the fifth group G5. That is, the correction mechanism 111 may, by decentering at least one of the just-mentioned lenses, correct a relative deviation in position between the two projection images P1 and P2 on the screen. In a case where a combination of a positive and a negative lens with almost no composite optical power is disposed separately within the projection lens 81, the correction mechanism 111 may, by decentering one of those lenses, correct a relative deviation in position between the two projection images P1 and P2 on the screen. Such a correction mechanism 111 (second mount portion 111a) has to be provided in at least one of the two projection lenses 81.

In this way, during correction of a deviation in position between the two projection images P1 and P2, adopting the design where the correction mechanism 111 decenters part of the lenses within the projection lens 81 eliminates the need to shift the entire projection lens 81 during the correction; this helps eliminate a shift mechanism for that purpose, and thus helps achieve cost reduction accordingly.

(3-6. Another Example of the Design of the PBS Prism)

Figure 9:
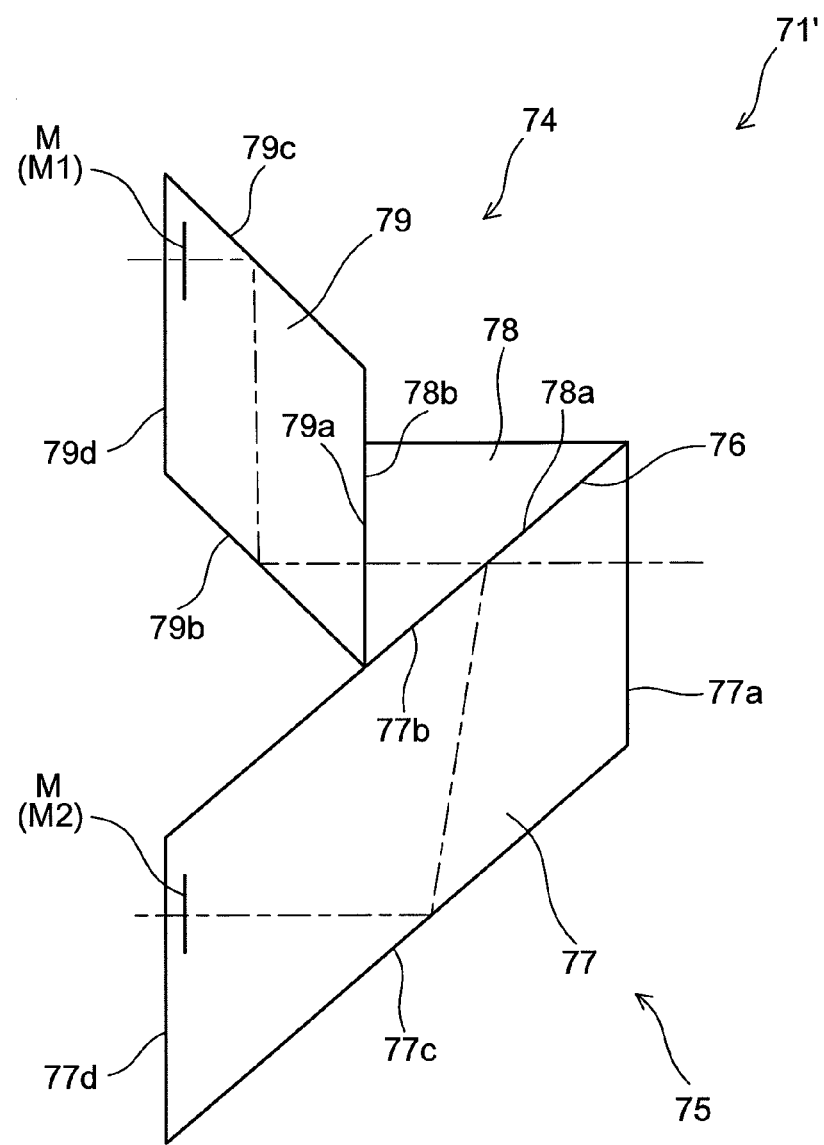
FIG. 9 is a sectional view showing another design of the PBS prism.

Next, another example of the design of the PBS prism 71 mentioned above will be described. FIG. 9 is a sectional view showing the design of a PBS prism 71', which substitutes for the PBS prism 71. The PBS prism 71' has two prism blocks 74 and 75 joined together with a PBS film 76 between them.

The PBS film 76 is a polarization splitting film that polarization-splits incident light, and has quite the same characteristics as the PBS film in the PBS prism 71 described previously. That is, the PBS film 76 is composed of a polarization splitting coating which is a multiple-layer film comprising alternate low- and high-refractive-index layers.

The prism blocks 74 and 75 bend the optical paths of the lights polarization-split at the PBS film 76, and are each composed of at least one prism. Specifically, the prism block 74 is composed of two prisms, and the prism block 75 is composed of one prism. In the following description, the one prism constituting the prism block 75 is referred to as the first prism 77, and the two prisms constituting the prism block 74 are referred to as the second prism 78 and the third prism 79 respectively. The prism blocks 74 and 75 bend the optical paths of the lights after polarization splitting in such a way that the positions of the two intermediary images M1 and M2 in the optical paths of those lights coincide in the optical axis direction of the relay optical system 61. Now, the prism blocks 74 and 75 will be described in detail.

The first prism 77 has four optical surfaces, namely an entrance surface 77a, a PBS surface (a surface on which the PBS film 76 is formed) 77b, a total reflection surface 77c, and an exit surface 77d. The entrance surface 77a and the PBS surface 77b form an angle of, for example, 49.5 degrees. The entrance surface 77a and the exit surface 77d are parallel to each other, and the PBS surface 77b and the total reflection surface 77c are also parallel to each other. The second prism 78 has two optical surfaces, namely a first joint surface 78a and a second joint surface 78b. The first joint surface 78a and the second joint surface 78b form an angle of, for example, 49.5 degrees.

The third prism 79 has four optical surfaces, namely a joint surface 79a, a first total reflection surface 79b, a second total reflection surface 79c, and an exit surface 79d. The joint surface 79a and the first total reflection surface 79b form an angle of, for example, 45.5 degrees. The joint surface 79a and the exit surface 79d are parallel to each other, and the first total reflection surface 79b and the second total reflection surface 79c are also parallel to each other. The joint surface 79a and the first total reflection surface 79b may instead form an angle of 49.5 degrees, but a smaller angle here helps reduce the prism length; accordingly, the angle is reduced within the range that satisfactorily fulfills the total reflection condition, and is set at 45.5 degrees as mentioned above.

The PBS surface 77b of the first prism 77 and the first joint surface 78a of the second prism 78 are joined together with adhesive in such a way that the entrance surface 77a of the first prism 77 and the second joint surface 78b of the second prism 78 are parallel to each other. The second joint surface 78b of the second prism 78 and the joint surface 79a of the third prism 79 are joined together with adhesive.

In the design described above, the light beam from the relay optical system 61 enters the first prism 77, constituting the PBS prism 71', through the entrance surface 77a, and is then split into P-polarized light and S-polarized light at the PBS surface 77b. Of these lights, the P-polarized light is transmitted through the PBS surface 77b, then, via the adhesive layer, strikes and passes straight through the first joint surface 78a of the second prism 78, and then, via the second joint surface 78b of the second prism 78 and the adhesive layer, enters the third prism 79 through the joint surface 79a.

The light beam (P-polarized light) that has entered the third prism 79 is reflected on the first and second total reflection surfaces 79b and 79c in this order, and then exits through the exit surface 79d, parallel to and, for example, 70.6 mm apart from the incident optical axis to the PBS prism 71. Here, the intermediary image M1 of P-polarized light is formed inside the third prism 79, near the exit surface 79d.

On the other hand, the S-polarized light split at the PBS surface 77b of the first prism 77 is reflected on that PBS surface 77b, then reaches and is reflected on the total reflection surface 77c, and exits through the exit surface 77d, parallel to and, for example, 81.2 mm apart from the optical axis of the relay optical system 61. The intermediary image M2 of S-polarized light is formed inside the first prism 77, near the exit surface 77d.

The light beams of P- and S-polarized lights emerging from the PBS prism 71' are parallel to each other, and the imaging positions of their respective intermediary images M1 and M2 are, for example, 151.8 mm apart from each other in the direction of polarization splitting. However, as a result of the optical paths of the light beams of P- and S-polarized lights being bent in the prism blocks 74 and 75, the two intermediary images M1 and M2 are imaged at the same position in the optical axis direction of the relay optical system 61. The optical path length of the PBS prism 71' is, for example, 189 mm.

With the PBS prism 71' designed as described above, the positions of the two intermediary images M1 and M2 in the optical paths of P- and S-polarized lights coincide in the optical axis direction of the relay optical system 61. That is, the intermediary images M1 and M2 are both located on the same plane perpendicular to the above-mentioned optical axis. In this way, the surfaces (the exit surfaces 77d and 79d) of the plurality of prism blocks 74 and 75 through which the light of the two intermediary images M1 and M2 exits from them can be made to coincide in the above-mentioned optical axis direction, and thus it is possible, by use of the two projection lenses 81 having an equal length, to project an image with their exit surfaces coincident. This increases flexibility in the above-mentioned zooming and shifting of the projection lenses 81. That is, for example, the projection light by the rear projection lens 81 is then no longer intercepted by the front projection lens 81; this makes it possible to perform wide-angle image projection satisfactorily, and to shift either projection lens 81 freely in directions perpendicular to the optical axis. Moreover, a comparatively large axis-to-axis distance can be secured between the two projection lenses 81, and this makes it possible to use large-diameter projection lenses 81.

Although the above description deals with a case where the second and third prisms 78 and 79 are joined together with an adhesive layer, these may instead be arranged with an air gap between them. The third prism 79 may be arranged rotated by a predetermined angle with respect to the second prism 78 about, as the rotation axis, the incident optical axis to the PBS prism 71'. Arranging it rotated by a predetermined angle in that way makes it possible to reduce the axis-to-axis distance between P- and S-polarized lights.

(3-7. Another Example of the Design of the Projection Lens)

Figure 10:
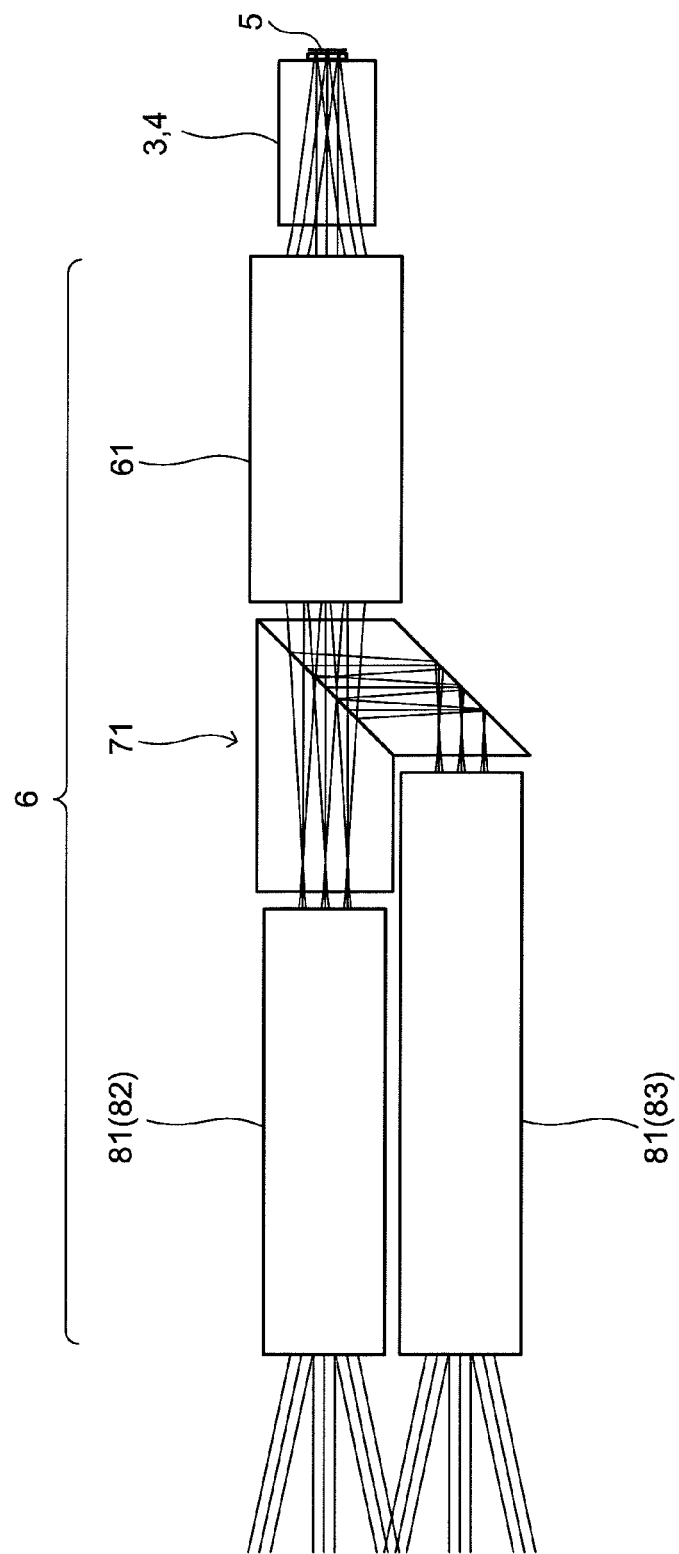
FIG. 10 is a sectional view showing another design of the two projection lenses in the projection optical system.

FIG. 10 is a sectional view showing another design of the projection lenses 81 in the projection optical system 6. As shown there, even when the exit surfaces, for P- and S-polarized lights, of the PBS prism 71 do not coincide in the optical axis direction of the relay optical system 61, it is preferable that the lengths of the two projection lenses 81 (first and second projection lenses 82 and 83) be set such that the positions of their most-screen-side exit surfaces coincide in the optical axis direction. This offers a benefit of increased freedom in the zooming and shifting of the two projection lenses 81, that is, a benefit similar to the above-mentioned one resulting from the use of the PBS prism 71'.

That is, even when the exit surfaces of the PBS prism 71 do not coincide in the optical axis direction, the positions of the most screen-side exit surfaces of the two projection lenses 81 coincide, and thus, for example, the projection light by the rear projection lens 81 is no longer intercepted by the front projection lens 81; this makes it possible to perform wide-angle image projection satisfactorily, and to shift either projection lens 81 freely in directions perpendicular to the optical axis.

(3-8. Another Example of the Design of the Relay Optical System.

In the projection optical system 6 in the embodiment under discussion, the relay optical system 61 may include a zoom mechanism.

When a movie is put on the screen in a movie theater, switching of the projection frame width from the vista size to the scope size can be achieved by use of an anamorphic converter, but may also be achieved by cutting top and bottom parts of the image on the display surface of the DMD 5 and increasing the projection size about 1.27 times so as to maintain the up-down width of the projection frame. In short, to cope with switching to the scope size without changing lenses, the projection lens needs to be provided with an extra zoom range of 1.27 times on the wide-angle side. However, cinematographic projection lenses are difficult to design and manufacture for their large image circle diameters and the high performance required of them; thus, it is not easy to provide them with a wide zoom range, in particular on the wide-angle side.

Thus, providing the relay optical system 61 with a zoom mechanism that can cope with the scope size makes it possible to switch to the scope size without changing the projection lens 81 and without using a projection lens 81 having a wide zoom range. Thus, it can be said that the relay optical system 61 may include a zoom mechanism that permits magnification to be varied according to the projection frame width of the projection image.

(3-9. Construction Data and Aberration Diagrams)

The construction data of the projection optical system 6 in the embodiment under discussion are shown below. Shown as the construction data are, from the leftmost column rightward, surface number Si, radius of curvature r, axial surface-to-surface distance d, refractive index for the d-line nd, Abbe number for d-line vd, and distance number DN. Radii of curvature r and axial surface-to-surface distances d are given in millimeters (mm).

A surface number Si indicates that the surface it refers to is the i-th as counted from the screen side. Specifically, as shown in FIG. 8, S1 to S30 respectively refer to the optical surfaces within the projection lens 81 from the exit surface of the lens L1 to the entrance surface of the lens L15; S31 to S32 respectively refer to the exit surface and entrance surface of the PBS prism 71; S33 to S55 respectively refer to the optical surfaces within the relay optical system 61 from the exit surface of the lens L21 to the entrance surface of the lens L31. S43 refers to an aperture stop (AP in FIG. 8). S56 to S57 respectively refer to the exit surface and entrance surface of the dichroic prism 4; S58 refers to the cover glass surface; S59 refers to the display surface of the DMD 5. Distance numbers DN are the serial numbers of the surface-to-surface distances as counted from the screen side.

Figure 11:
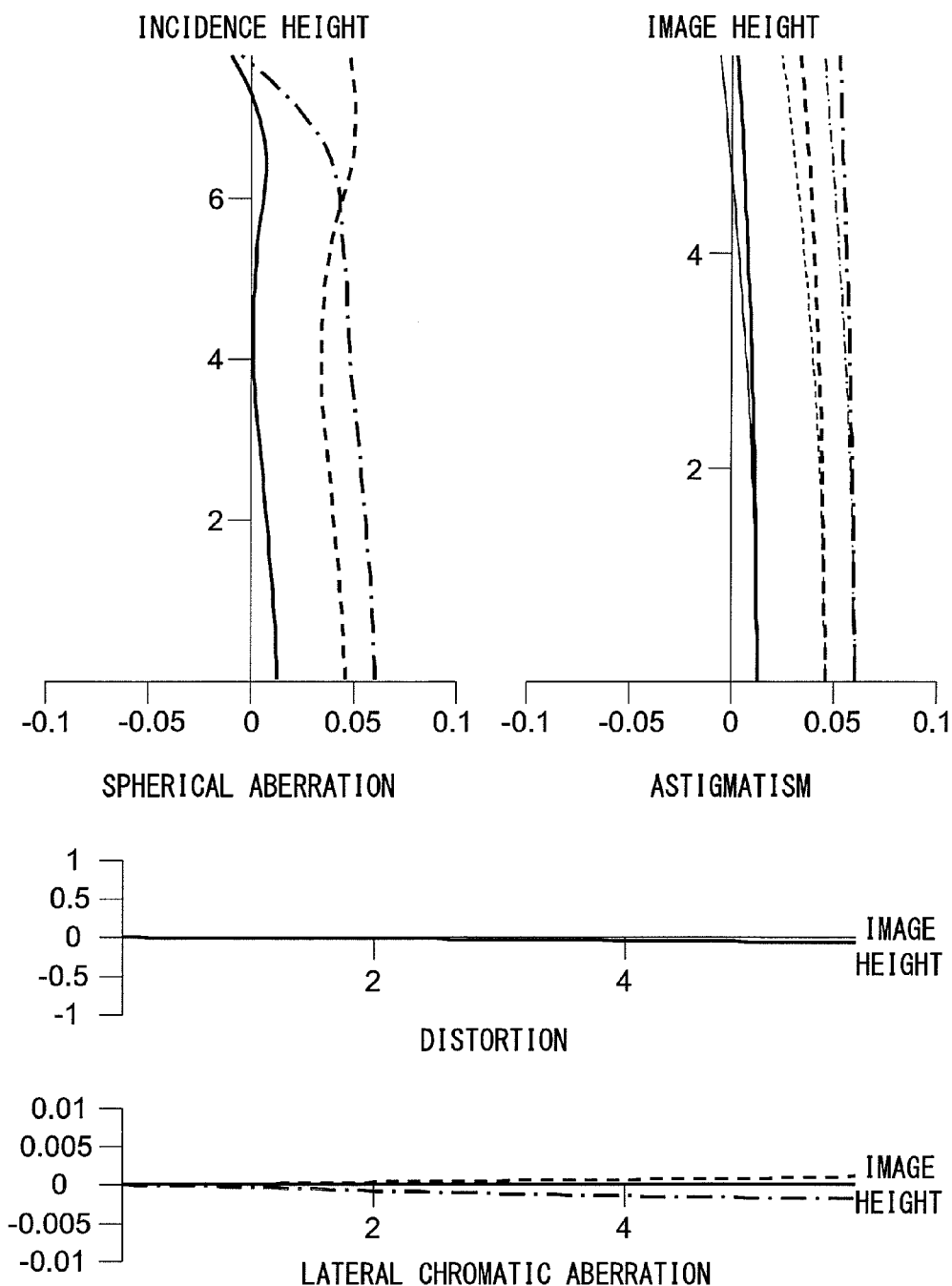
FIG. 11 is an illustrative diagram showing various aberrations at the telephoto end, with the projection lenses in the reference position.
Figure 12:
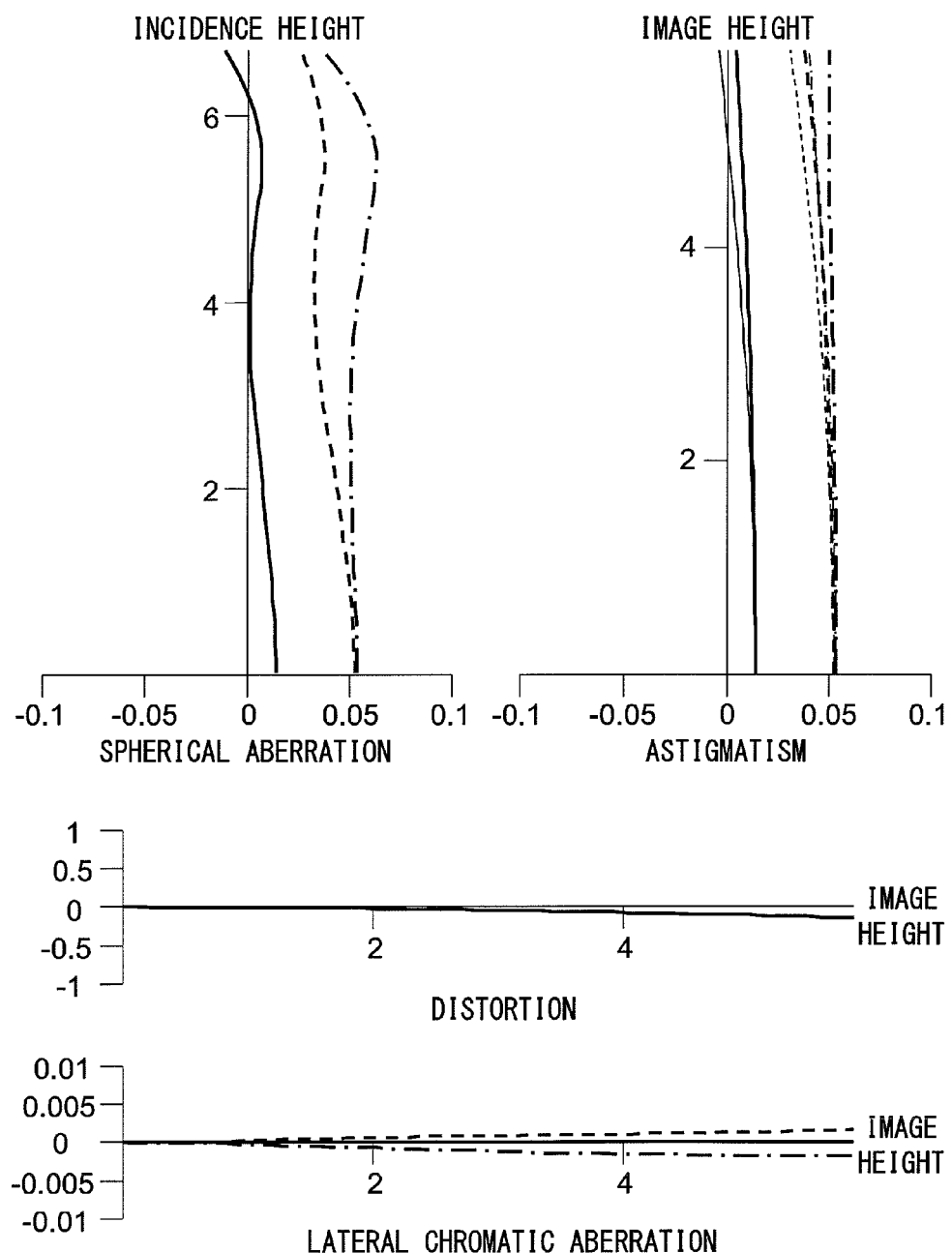
FIG. 12 is an illustrative diagram showing various aberrations at the middle position between the telephoto and wide-angle ends, with the projection lenses in the reference position.
Figure 13:
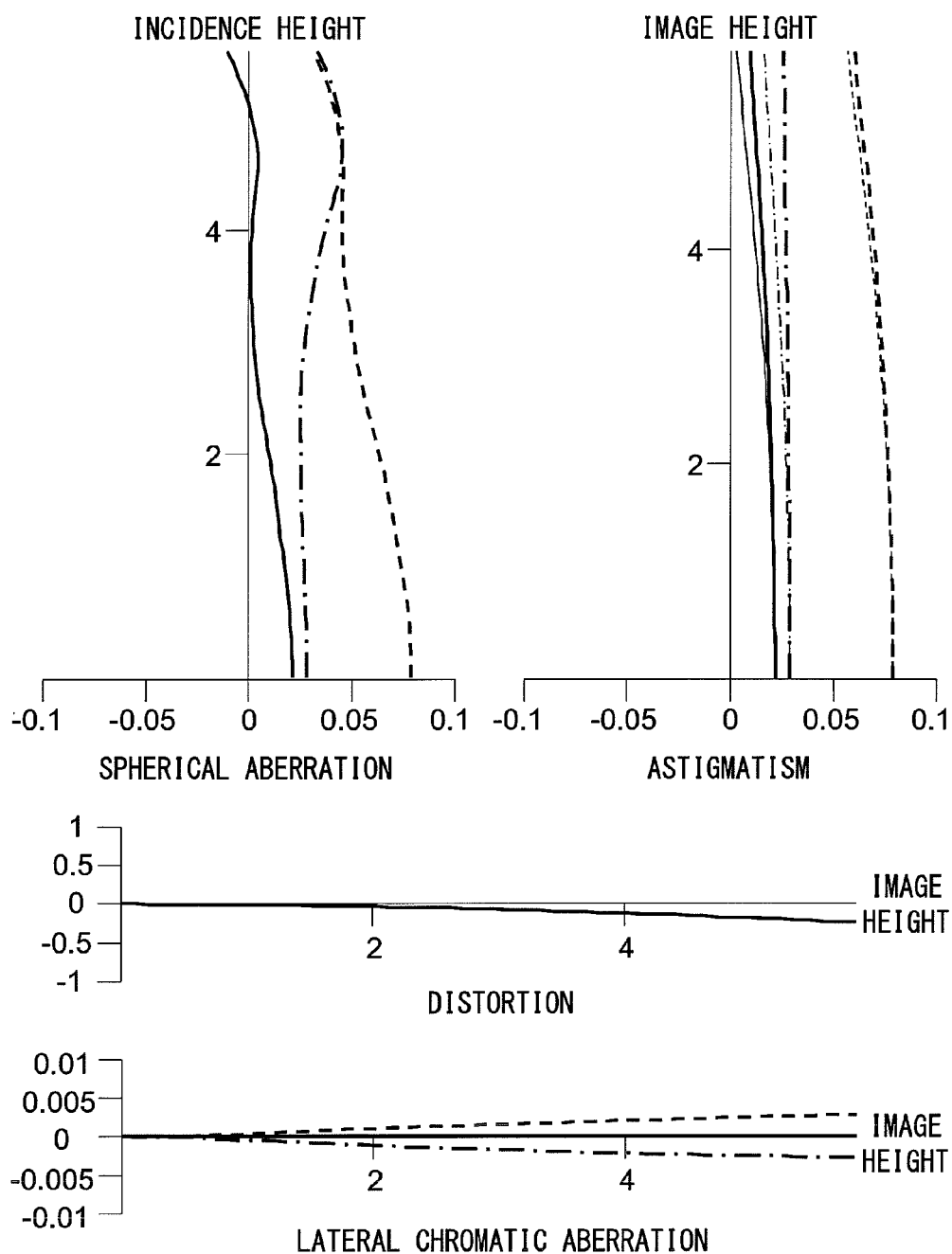
FIG. 13 is an illustrative diagram showing various aberrations at the wide-angle end, with the projection lenses in the reference position.
Figure 14:
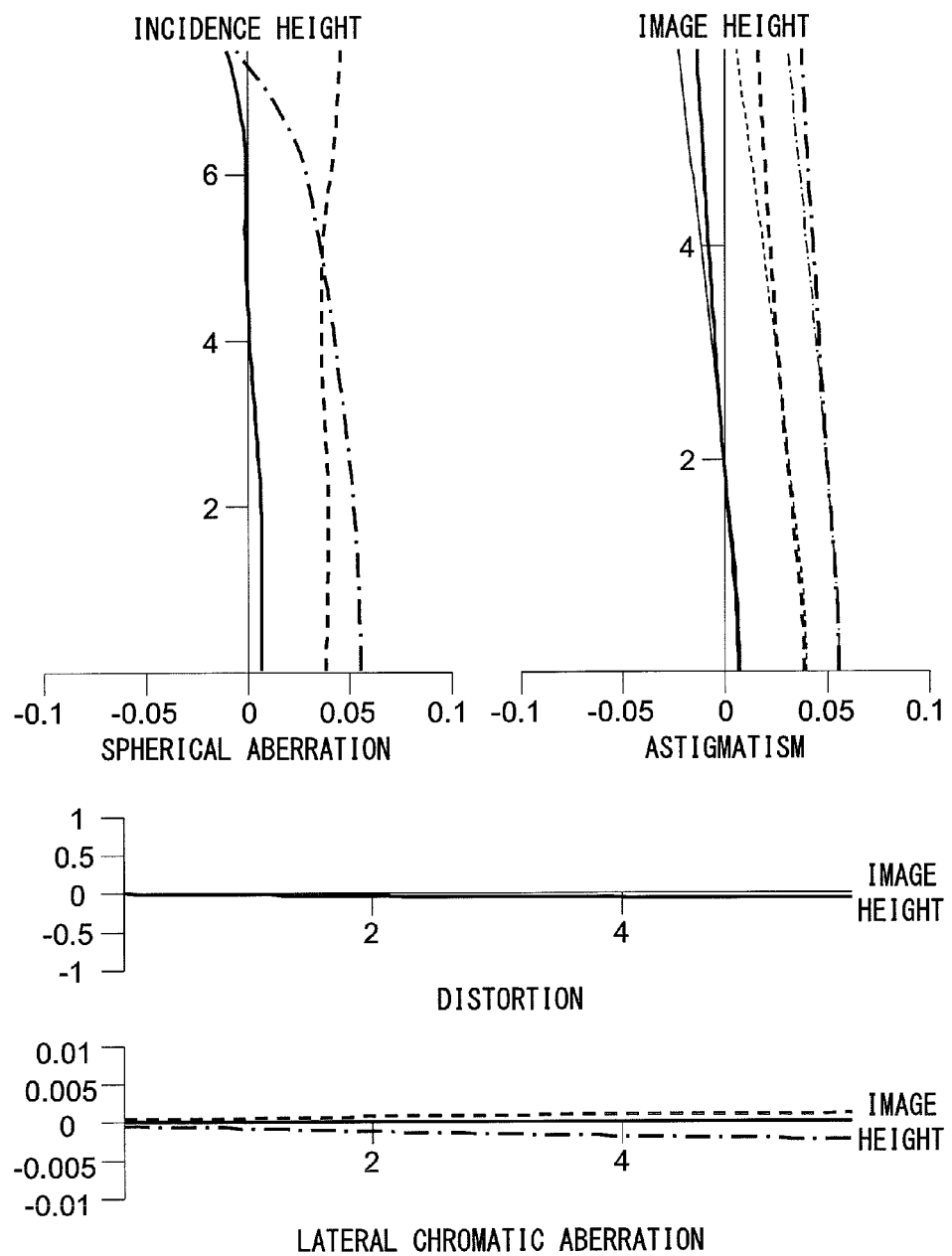
FIG. 14 is an illustrative diagram showing various aberrations at the telephoto end, with the projection lenses in a decentered position.
Figure 15:
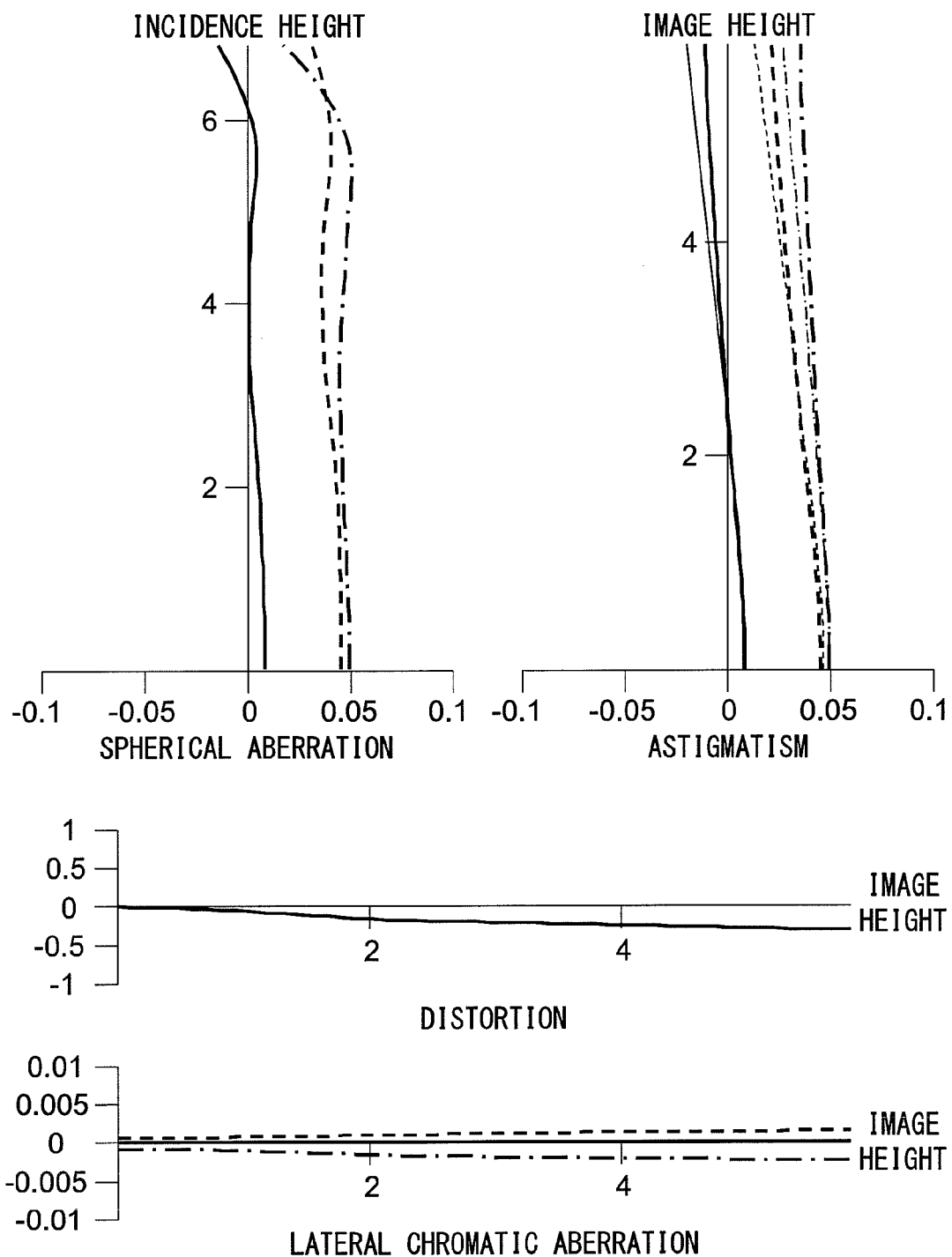
FIG. 15 is an illustrative diagram showing various aberrations at the middle position between the telephoto and wide-angle ends, with the projection lenses in a decentered position.
Figure 16:
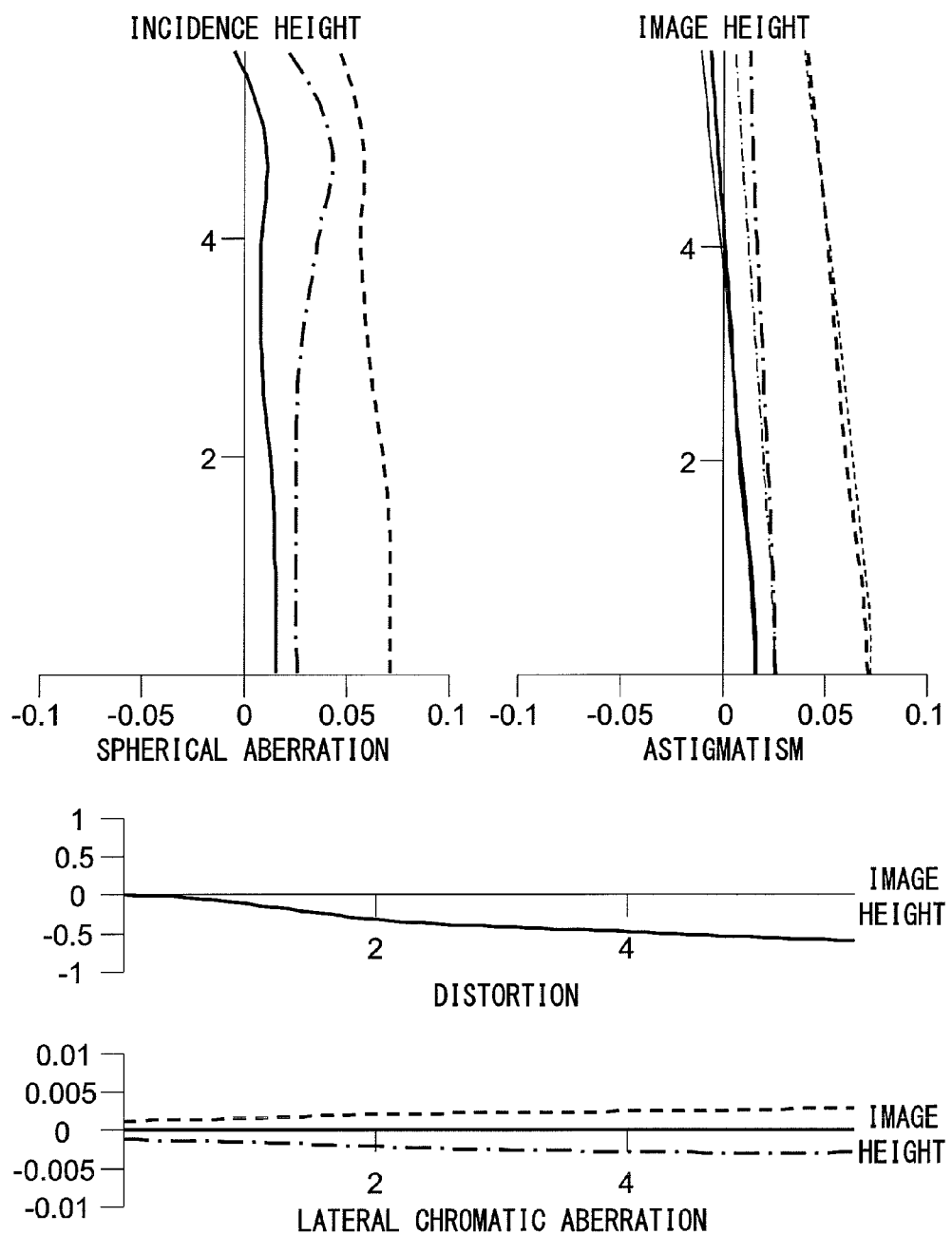
FIG. 16 is an illustrative diagram showing various aberrations at the wide-angle end, with the projection lenses in a decentered position.

FIGS. 11 to 13 are aberration diagrams obtained, respectively, at the telephoto end (tele), at the middle position (middle) between the telephoto and wide-angle ends, and at the wide-angle end (wide), all with the projection lens 81 in the reference position (with no decentering). On the other hand, FIGS. 14 to 16 are aberration diagrams obtained, respectively, at the telephoto end, at the middle position between the telephoto and wide-angle ends, and at the wide-angle end, all with the projection lens 81 in a decentered position. In the decentered position, while the relay optical system 61 is kept stationary, the projection lens 81 is decentered 7 mm with respect to the optical axis of the relay optical system 61. The reason that the projection lens is decentered 7 mm is as follows. In the relay optical system 61, the DMD 5 side image height is, with the relay optical system 61 unshifted, 12.7 mm (with the relay optical system 61 shifted, 16.1 mm); in the relay optical system 61, the intermediary image side image height is 25.4 mm (12.7 mm×2 (magnification)); in the projection lens 81, the intermediary image side image height is 32.2 mm (16.1 mm×2 (magnification)); 32.2−25.4=6.8 mm, and allowing for a margin gives 7 mm.

The aberration diagrams in each of FIGS. 11 to 16 comprise a spherical aberration diagram, an astigmatism diagram, a distortion diagram, and a lateral chromatic aberration diagram. The spherical aberration diagrams, the astigmatism diagrams, and the chromatic aberration diagrams separately show aberration for the e-line (solid lines), the g-line (dash-and-dot lines), and the c-line (broken lines). In the astigmatism diagrams, thick solid, dash-and-dot, and broken lines respectively represent the astigmatism for the e-, g-, and c-lines on the meridional image surface, and fine solid, dash-and-dot, and broken lines respectively represent the astigmatism for the e-, g-, and c-lines on the sagittal image surface. The distortion diagrams show the distortion for the e-line. The unit for both the vertical and horizontal axes is millimeters (mm) in all the aberration diagrams except the distortion diagrams, where the unit for the vertical axis is percent (%) and the unit for the horizontal axis is millimeters (mm). In the spherical aberration diagrams, the vertical axis represents the incidence height at the entrance pupil.

| Si | r | d | nd | vd | DN |
|---|---|---|---|---|---|
| 1 | 94.798 | 7.199 | 1.61800 | 63.39 | 1 |
| 2 | 356.748 | 0.200 | | | 2 |
| 3 | 84.977 | 3.022 | 1.77250 | 49.62 | 3 |
| 4 | 39.110 | 11.842 | | | 4 |
| 5 | 1026.045 | 2.451 | 1.74400 | 44.90 | 5 |
| 6 | 60.239 | 8.830 | | | 6 |
| 7 | −114.075 | 3.350 | 1.58144 | 40.89 | 7 |
| 8 | 110.608 | 19.297 | | | 8 |
| 9 | 6492.130 | 5.975 | 1.77250 | 49.62 | 9 |
| 10 | −89.07 | 136.304 | | | 10 |
| 11 | 79.844 | 3.616 | 1.65844 | 50.85 | 11 |
| 12 | 8150.703 | 30.826 | | | 12 |
| 13 | −206.526 | 1.694 | 1.77250 | 49.62 | 13 |
| 14 | 60.904 | 2.657 | | | 14 |
| 15 | 96.041 | 4.080 | 1.58144 | 40.89 | 15 |
| 16 | −1610.597 | 1.573 | | | 16 |
| 17 | 143.014 | 5.707 | 1.49700 | 81.61 | 17 |
| 18 | −81.267 | 26.814 | | | 18 |
| 19 | 58.098 | 7.259 | 1.49700 | 81.61 | 19 |
| 20 | −78.655 | 9.160 | | | 20 |
| 21 | −59.030 | 1.772 | 1.77250 | 49.62 | 21 |
| 22 | 47.578 | 10.095 | | | 22 |
| 23 | 426.061 | 7.268 | 1.49700 | 81.61 | 23 |
| 24 | −52.612 | 2.805 | | | 24 |
| 25 | 132.936 | 11.930 | 1.49700 | 81.61 | 25 |
| 26 | −43.531 | 0.200 | | | 26 |
| 27 | −63.246 | 2.325 | 1.77250 | 49.62 | 27 |
| 28 | 448.725 | 107.824 | | | 28 |
| 29 | 167.901 | 7.982 | 1.49700 | 81.61 | 29 |
| 30 | −256.462 | 11.000 | | | 30 |
| 31 | INF | 142.000 | 1.51680 | 64.20 | 31 |
| 32 | INF | 15.060 | | | 32 |
| 33 | −315.033 | 8.362 | 1.61800 | 63.39 | 33 |
| 34 | −83.897 | 2.247 | | | 34 |
| 35 | 116.579 | 6.630 | 1.61800 | 63.39 | 35 |
| 36 | −2653.304 | 0.200 | | | 36 |
| 37 | 50.921 | 7.238 | 1.61800 | 63.39 | 37 |
| 38 | 90.050 | 17.774 | | | 38 |
| 39 | 37.384 | 2.822 | 1.51680 | 64.20 | 39 |
| 40 | 24.119 | 13.355 | | | 40 |
| 41 | −54.328 | 1.448 | 1.51742 | 52.15 | 41 |
| 42 | 29.922 | 48.133 | | | 42 |
| 43 | INF | 3.406 | | | 43 |
| (Aperture) | | | | | |
| 44 | −54.497 | 2.729 | 1.77250 | 49.62 | 44 |
| 45 | 9369.209 | 1.575 | | | 45 |
| 46 | 587.099 | 8.906 | 1.49700 | 81.61 | 46 |
| 47 | −42.230 | 0.200 | | | 47 |
| 48 | 100.071 | 8.674 | 1.49700 | 81.61 | 48 |
| 49 | −89.520 | 0.200 | | | 49 |
| 50 | 350.793 | 2.486 | 1.77250 | 49.62 | 50 |
| 51 | 54.142 | 3.144 | | | 51 |
| 52 | 62.778 | 10.822 | 1.49700 | 81.61 | 52 |
| 53 | −111.603 | 80.040 | | | 53 |
| 54 | 86.938 | 7.490 | 1.61800 | 63.39 | 54 |
| 55 | −2216.841 | 20.458 | | | 55 |
| 56 | INF | 85.000 | 1.51680 | 64.20 | 56 |
| 57 | INF | 2.000 | | | 57 |
| 58 | INF | 3.000 | 1.50847 | 61.19 | 58 |
| 59 | INF | | | | |

Table 2 shows the group-to-group distances in the projection lens 81, and Table 3 shows the amount of movement of each group for zooming. Group-to-group distances and amounts of movement are given in millimeters (mm). The group-to-group distances in Table 2 are indicated by the corresponding distance numbers DN in the construction data shown above. Specifically, distance numbers DN 8, 12, 16, 20, and 28 respectively correspond to the distance between the first and second groups G1 and G2, the distance between the second and third groups G2 and G3, the distance between the third and fourth groups G3 and G4, the distance between the fourth and fifth groups G4 and G5, and the distance between the fifth and sixth groups G5 and G6. The amounts of movement in Table 3 are relative to those at the telephoto end (a movement toward the screen being positive).

TABLE 2

Group-To-Group Distances (mm)

| Distance No. DN | Tele | Middle | Wide |
|---|---|---|---|
| 8 | 19.297 | 24.409 | 31.056 |
| 12 | 30.826 | 25.714 | 19.068 |
| 16 | 1.573 | 12.834 | 27.136 |
| 20 | 9.160 | 6.080 | 3.850 |
| 28 | 107.824 | 99.643 | 87.570 |

TABLE 3

Lens Group Movement Amounts (mm)

| | Tele | Middle | Wide |
|---|---|---|---|
| G1 | 0.000 | 0.000 | 0.000 |
| G2 | 0.000 | 5.112 | 11.759 |
| G3 | 0.000 | 0.000 | 0.000 |
| G4 | 0.000 | 11.261 | 25.563 |
| G5 | 0.000 | 8.181 | 20.254 |
| G6 | 0.000 | 0.000 | 0.000 |

(4. Projection of a Stereoscopically Viewable Image)

Figure 17:
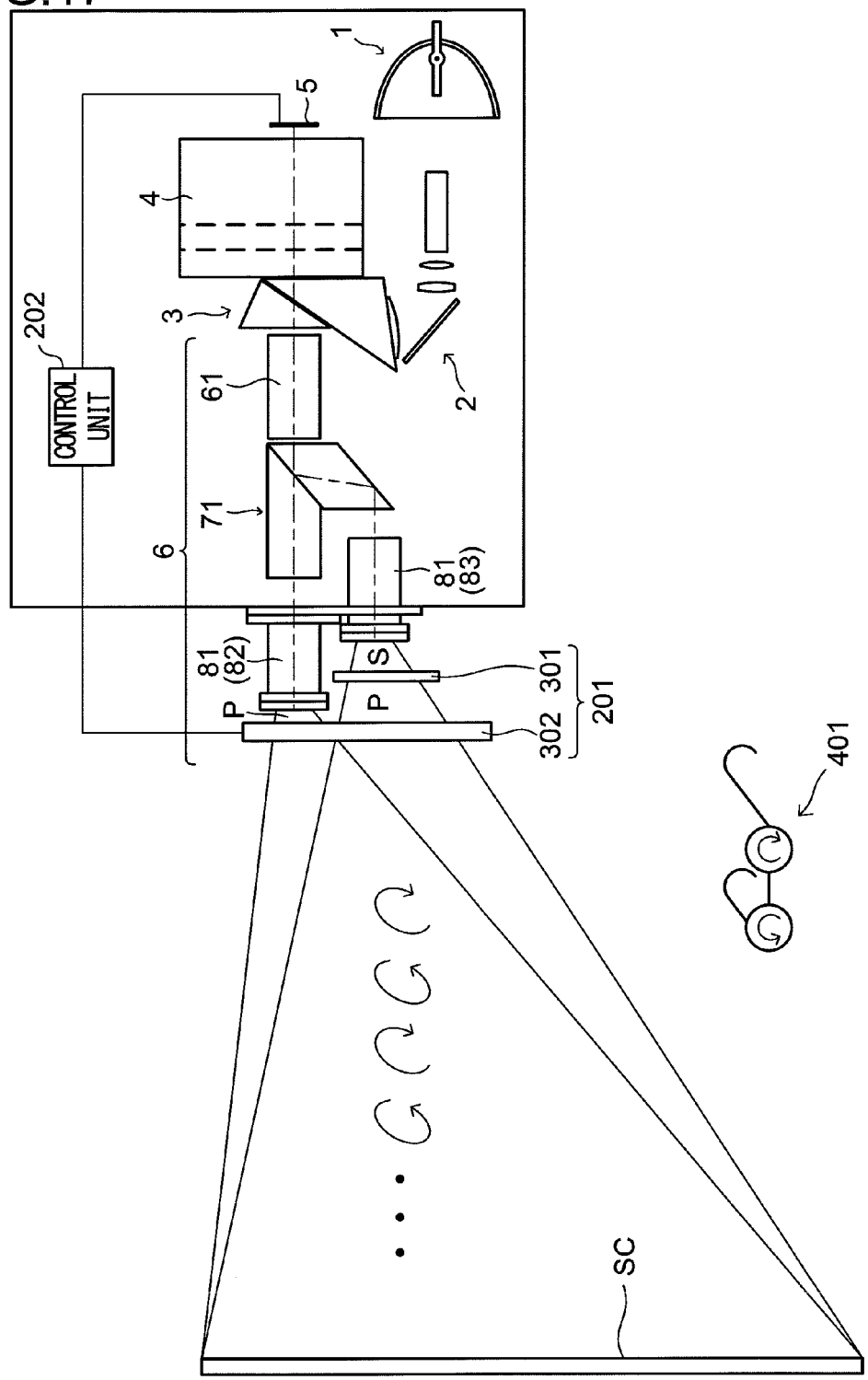
FIG. 17 is an illustrative diagram showing an outline of the design of an image projecting device that projects a stereoscopically viewable image.

Next, a description will be given of an image projecting device according to the present invention which has the basic design described above and which can achieve projection of a stereoscopically viewable image. FIG. 17 is an illustrative diagram showing an outline of the design of the image projecting device. This image projecting device is provided with, in addition to the basic design described above, polarization controlling means 201 and a control unit 202. The polarization controlling means 201 constitutes part of the projection optical system 6.

The polarization controlling means 201 controls the polarization states of the lights (P- and S-polarized lights) that have been polarization-split at the PBS prism 71 in the projection optical system 6. More specifically, the polarization controlling means 201 controls the polarization states of incident lights in such a way that the polarization states of emergent lights are identical between the optical paths of those lights and in addition switch alternately between two different polarization states. To achieve such control, the polarization controlling means 201 is composed of a half-wave plate 301 and a polarization converting element 302.

The half-wave plate 301 is a phase plate (first phase plate) that converts one (for example, S-polarized light) of the lights polarization-split at the PBS prism 71 into light (for example, P-polarized light) with the same polarization direction as the other, and is disposed on the screen SC side of the second projection lens 83. The polarization converting element 302 converts one (for example, P-polarized light) of the lights which, after polarization splitting at the PBS prism 71, is incident via the half-wave plate 301 and the other (for example, P-polarized light) of the lights after polarization splitting into, and alternately between, two mutually different polarization states (for example, right and left circularly polarized lights), and is disposed on the screen SC side of the first projection lens 82 and on the screen SC side of the half-wave plate 301 so as to be shared by the two optical paths. Usable as the polarization converting element 302 is, for example, a Z-Screen manufactured by Real D, which switches incident linearly polarized lights alternately between right and left circularly polarized lights at high speed and let them out.

The control unit 202 is a controller that controls the DMD 5 and the polarization controlling means 201. More specifically, the control unit 202 makes the DMD 5 perform image display on a time-division basis and makes, synchronously with the image display, makes the polarization controlling means 201 switch emergent lights between the two polarization states on a time-division basis.

In the above design, of the image light from the DMD 5, one (for example, S-polarized light) of the lights polarization-split at the PBS prism 71 passes through the second projection lens 83 and strikes the half-wave plate 301, where it is converted into P-polarized light and then enters the polarization converting element 302. Of the image light from the DMD 5, the other (for example, P-polarized light) of the lights polarization-split at the PBS prism 71 passes through the first projection lens 82 and directly enters the polarization converting element 302. Thus, the polarization converting element 302 receives two linearly polarized lights having their polarization directions aligned in one direction. In the polarization converting element 302, the two incident linearly polarized lights are simultaneously converted into, and alternately between, right and left circularly polarized lights that then emerge to be projected onto the screen SC.

Meanwhile, the control unit 202 makes the DMD 5 display right-eye and left-eye images on a time-division basis and in addition makes, synchronously with that, the polarization converting element 302 switch between and let out right and left circularly polarized lights on a time-division basis. In this case, wearing polarizing glasses 401 (for example, ones having for the right eye a polarizing plate that transmits right circularly polarized light alone and for the left eye a polarizing plate that transmits left circularly polarized light alone) enables an observer to observe the projected image stereoscopically, by viewing the right-eye projection image with the right eye and the left-eye projection image with the left eye on a time-division basis.

As described above, the lights after polarization splitting are both converted into identical, that is right or left, circularly polarized light and are let out alternately by the polarization controlling means 201. Thus, directing the right and left circularly polarized lights via the polarizing glasses 401 to an observer's right and left eyes respectively as described above enables the observer to perceive a stereoscopic image.

For example, in a design where an image is projected through a polarizing plate inserted in the optical path of projection light that is randomly polarized light, half the amount of light is lost in the polarizing plate. In contrast, in the embodiment under discussion, an image is projected by use of both of two linearly polarized lights after polarization splitting; this, compared with the just-mentioned design employing a polarizing plate, helps reduce the loss of light and obtain a bright projected image.

Owing to the polarization controlling means 201 being composed of the half-wave plate 301 and the polarization converting element 302, it is possible, while using both of the two linearly polarized lights after polarization splitting, to switch, at high speed, alternately between the right and left circularly polarized lights needed for observation of a stereoscopic image by use of the polarizing glasses 401. This reliably enables the observer to perceive a bright stereoscopic image via the polarizing glasses 401.

Figure 18:
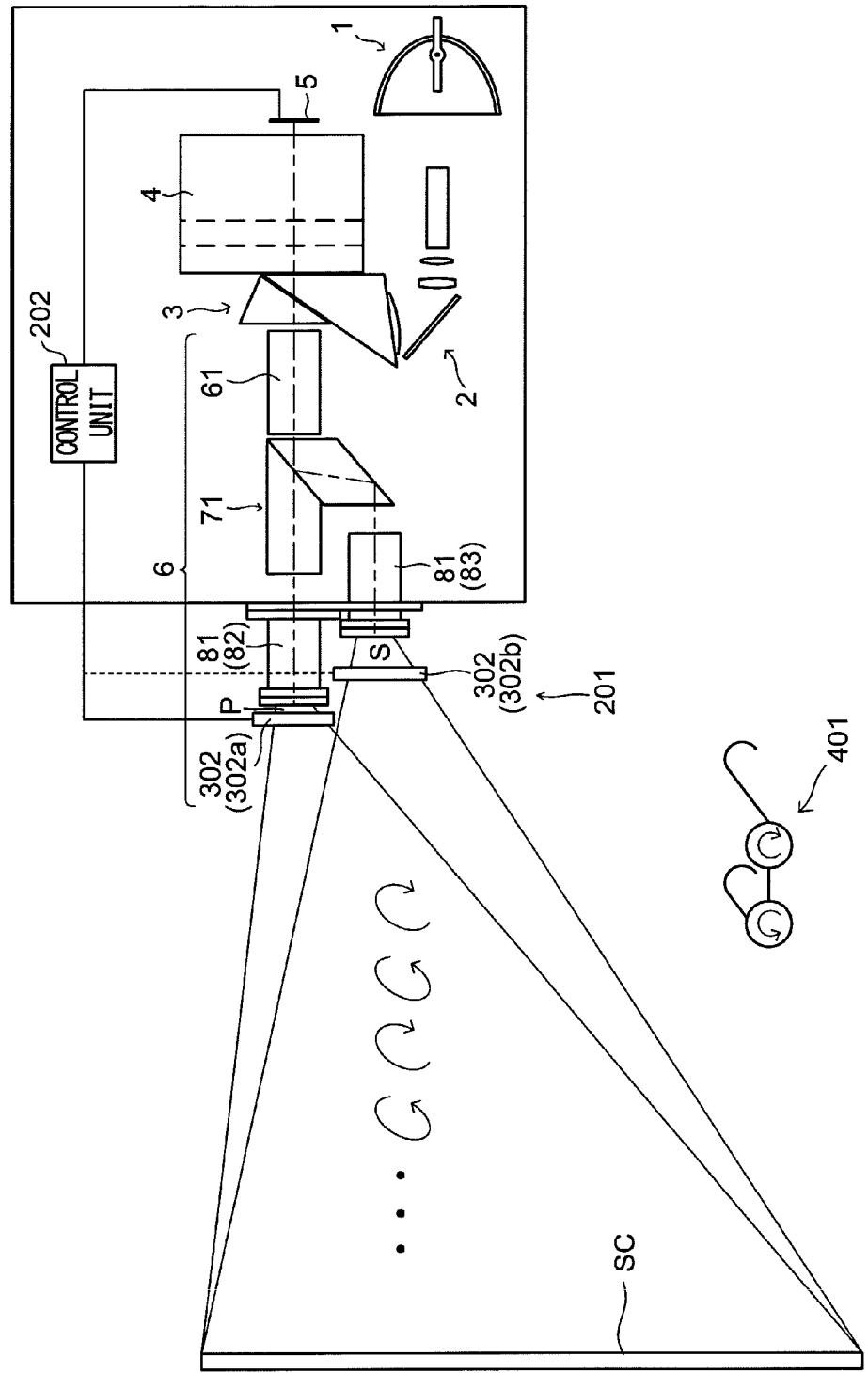
FIG. 18 is an illustrative diagram showing another example of the design of the polarization controlling means in the projection optical system in the image projecting device.

FIG. 18 is an illustrative diagram showing another example of the design of the polarization controlling means 201. The polarization controlling means 201 may be composed of two polarization converting elements 302a and 302b that are disposed respectively in the optical paths of the lights after polarization splitting at the PBS prism 71. The polarization converting elements 302a and 302b convert the polarization states of the above-mentioned lights individually, and convert incident linearly polarized lights into, and alternately between, two mutually different polarization states. The polarization converting elements 302a and 302b are, under the control of the control unit 202, driven in mutually different manners (for example, they are driven in the opposite manners), and convert the polarization state of the lights polarization-split at the PBS prism 71 so that emergent lights have an identical polarization state.

With this design, one (for example, P-polarized light) of the lights polarization-split at the PBS prism 71 is converted into, and alternately between, right and left circularly polarized lights at the polarization converting element 302a, and the other (for example, S-polarized light) of the lights after the polarization splitting is converted into, and alternately between, right and left circularly polarized lights at the polarization converting element 302b; the lights are then projected onto the screen. Thus, although the polarization directions of the linearly polarized lights that enter the polarization converting elements 302a and 302b differ, by driving the polarization converting elements 302a and 302b in the opposite manners, it is possible, while keeping the lights emerging from the polarization converting element 302a and 302b in the same polarization state (right or left circularly polarized light), to switch them alternately between two different polarization states (right and left circularly polarized light). Thus, as with the design described previously, an observer, wearing polarizing glasses 401, can observe a stereoscopic image.

As described above, owing to the polarization controlling means 201 being composed of two polarization converting elements 302a and 302b, and in addition the two polarization converting elements being driven in the opposite manners, even without a phase plate for making identical the polarization directions of the two types of light (P- and S-polarized lights) polarization-split at the PBS prism 71, it is possible to keep the lights emerging from the two polarization converting elements 302a and 302b in the same polarization state to enable an observer to perceive a stereoscopic image. This eliminates the need for the above-mentioned phase plate, and thus helps achieve cost reduction and improved heat resistance.

To improve the purity of polarized lights, and to reduce cross talk between the left and right projection images, a polarizing plate may be disposed on the projection lens 81 side of the polarization converting element 302.

Figure 19:
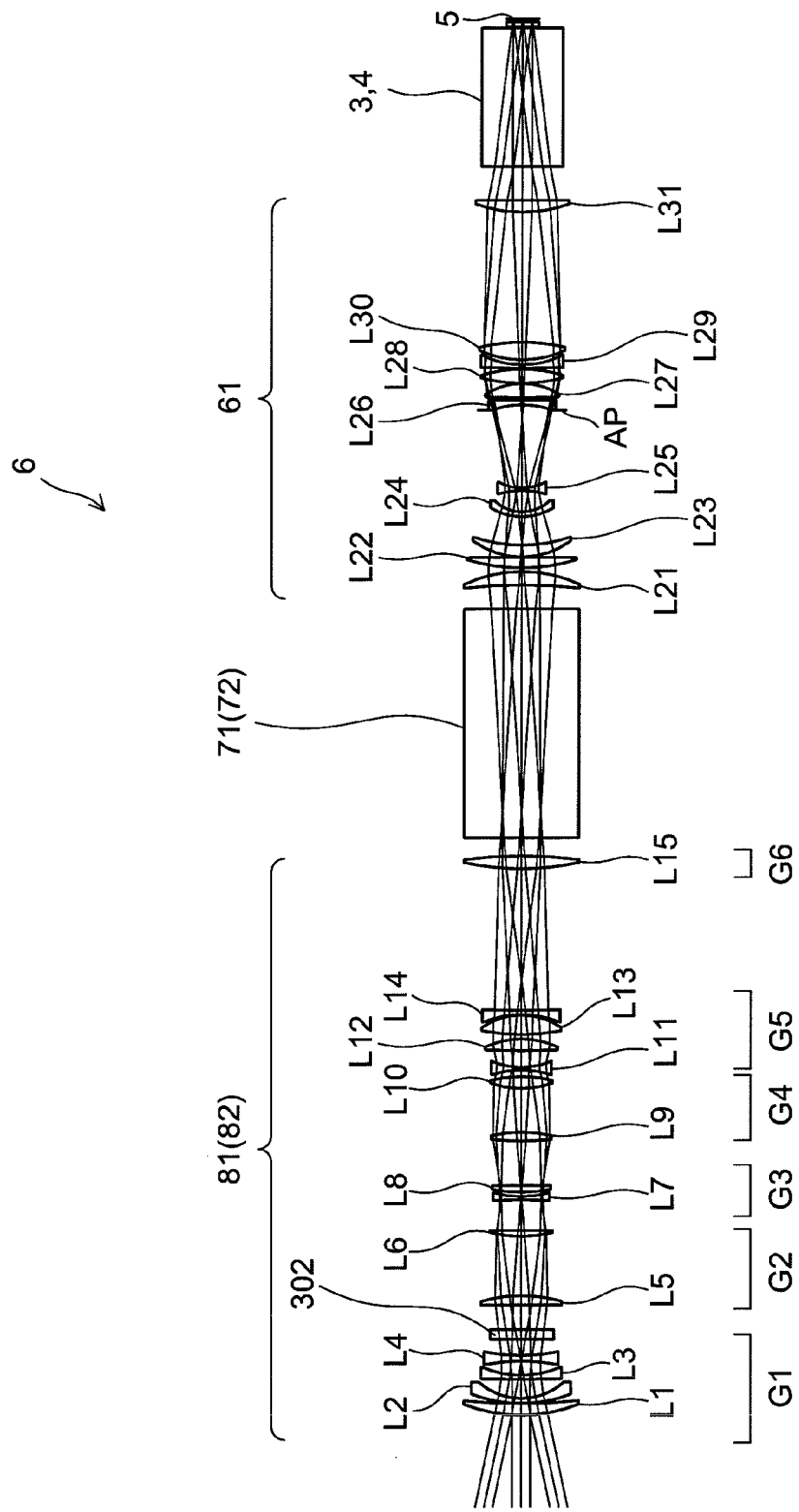
FIG. 19 is an illustrative diagram showing another example of the arrangement position of the polarization converting element in the polarization controlling means in the projection optical system.

Although the above description deals with an example where the polarization converting element 302 is disposed on the screen side of the two projection lenses 81, the polarization converting element 302 may instead be disposed in the optical paths of the two projection lenses 81. In a case where a half-wave plate 301 is used, this needs to be disposed on the DMD 5 side of the polarization converting element 302. FIG. 19 is an illustrative diagram showing another example of the arrangement position of the polarization converting element 302.

As described above, disposing the polarization converting element 302 in the optical paths of the two projection lenses 81, compared with disposing it on the screen side (enlargement side) of the two projection lenses 81, helps reduce variation in the incidence angle of the light entering the polarization converting element 302. This enhances polarization conversion efficiency at the polarization converting element 302, and consequently enables the observer to perceive a bright stereoscopic image. The element size can also be made smaller than in a case where the polarization converting element 302 is disposed on the screen side of the two projection lenses 81.

(4-1. Another Example of the Design for Projection of a Stereoscopically Viewable Image)

The image projecting device described above is so designed that the polarization of the projected image light is switched by the polarization controlling means 201. Stereoscopy of an image is possible also with a design where, while the polarization of the projected image light is kept constant, the polarization of light transmitted through polarizing shutter glasses is switched alternately between left and right so that the right or left eye alone is presented with an image. Such an image projecting device will be described specifically below.

Figure 20:
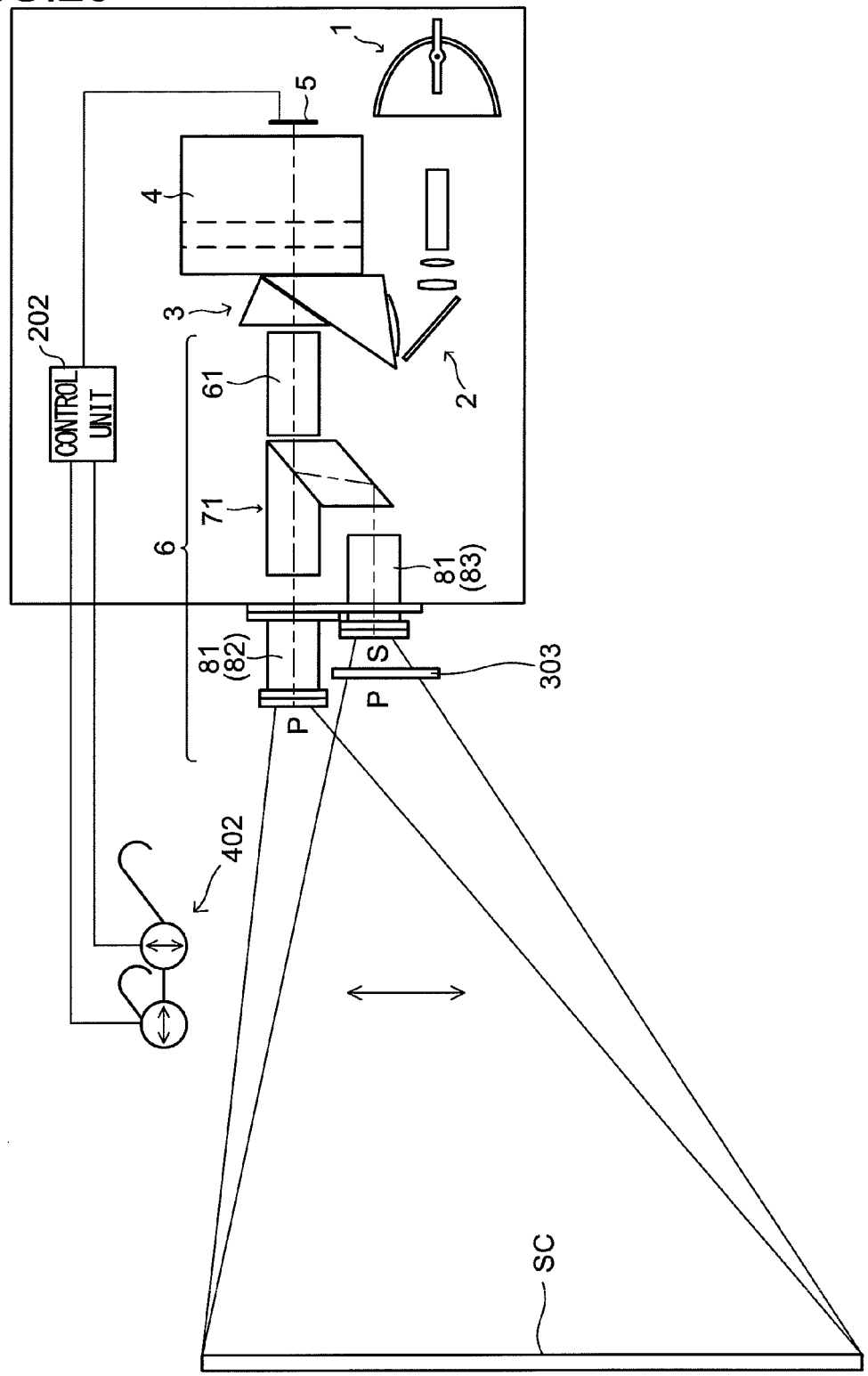
FIG. 20 is an illustrative diagram showing another example of the design of the image projecting device.

FIG. 20 is an illustrative diagram showing an example of another design of an image projecting device. This image projecting device is provided with, in addition to the basic design described above, a polarization converting element 303, polarizing shutter glasses 402, and a control unit 202.

The polarization converting element 303 is an element (first polarization converting element) that converts one (for example, S-polarized light) of the lights polarization-split at the PBS prism 71 into the same polarization state (for example, P-polarized light) as the other, and is composed of, for example, a half-wave plate. The polarization converting element 303 is disposed on the entrance or exit side of one projection lens 83.

The polarizing shutter glasses 402 selectively transmit one of mutually perpendicular linearly polarized lights, and are composed of, for example, polarization selecting elements arranged for the right and left eyes respectively, the polarization selecting elements each comprising a linear polarizing plate and a liquid crystal cell (for example, the pi cell disclosed in U.S. Pat. No. 4,566,758). The liquid crystal cell just mentioned can control the alignment direction of liquid crystal according to the applied voltage, and switches between a state in which it transmits incident linear polarized light without changing its polarization direction and a state in which it turns the polarization direction of incident linear polarized light by 90 degrees.

The control unit 202 controls the DMD 5 and light transmission through the polarization selecting elements arranged for the right and left eyes respectively in the polarizing shutter glasses 402. More specifically, the control unit 202 makes the DMD 5 display right-eye and left-eye images on a time-division basis and in addition, synchronously with that, switches the polarization selecting elements in the polarizing shutter glasses 402. Specifically, when the right-eye image is displayed on the DMD 5, the control unit 202 controls the polarizing shutter glasses 402 in such a way that the polarization selecting element for the right eye transmits the image light (for example, P-polarized light) and that the polarization selecting element for the left eye intercepts the image light (for example, P-polarized light). On the other hand, when the left-eye image is displayed on the DMD 5, the control unit 202 controls the polarizing shutter glasses 402 in such a way that the polarization selecting element for the right eye intercepts the image light (for example, P-polarized light) and that the polarization selecting element for the left eye transmits the image light (for example, P-polarized light). The control of the polarizing shutter glasses 402 by the control unit 202 is performed, preferably, by wireless communication.

In this way, the lights after polarization splitting at the PBS prism 71 are aligned into identical linearly polarized light and then let out by the polarization converting element 303, and the image light is directed to an observer's right and left eyes alternately by the polarizing shutter glasses 402. This enables the observer to perceive a stereoscopic image.

In view of the foregoing, an image projecting device according to the invention may be said to be so designed as to include a DMD 5 as a display element, a projection optical system 6, and a control unit 202 which controls the DMD 5 and polarizing shutter glasses 402, wherein the projection optical system 6 is provided with a polarization converting element 303 which converts one (for example, S-polarized light) of the lights polarization-split at a PBS prism 71 into light (for example, P-polarized light) with the same polarization direction as the other, and the control unit 202 makes the DMD 5 performs image display on a time-division basis and in addition switches, synchronously with the image display and alternately between left and right on a time-division basis, light transmission through polarization selecting elements arranged for the right and left eyes in the polarizing shutter glasses 402 that selectively transmit the same linear polarized light as the projection light onto a screen SC.

Figure 21:
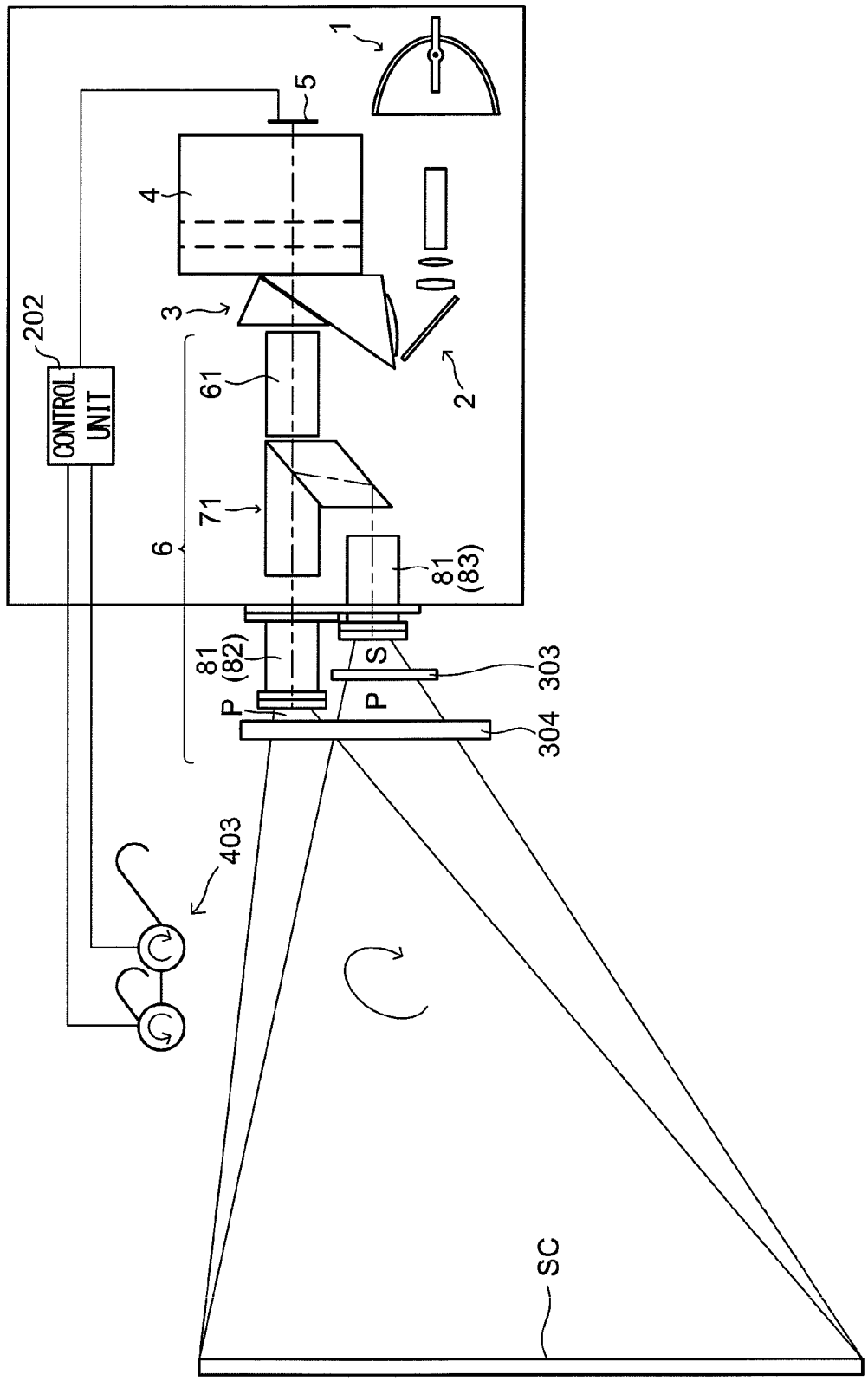
FIG. 21 is an illustrative diagram showing yet another example of the design of the image projecting device.

In display of a stereoscopic image by use of polarizing shutter glasses, the image may be projected with circularly polarized light, and polarizing shutter glasses may be used that switch between transmission and interception of circularly polarized light. FIG. 21 is an illustrative diagram showing yet another example of the design of an image projecting device. This image projecting device has, in the design shown FIG. 20, a quarter-wave plate 304 disposed on the screen SC side of the two projection lenses 82 and 83 and in addition on the screen SC side of the polarization converting element 303. The quarter-wave plate 304 converts incident linearly polarized light (for example, P-polarized light) into circularly polarized light and lets it out. The polarizing shutter glasses 403 used are composed of, for example, a linear polarizing plate, a liquid crystal cell, a linear polarizing plate, and a quarter-wave plate arranged in this order from the observer's eye.

With the design described above, when the right-eye image is displayed on the DMD 5, the control unit 202 controls the polarizing shutter glasses 403 in such a way that the right-eye polarization selecting element of the polarizing shutter glasses 403 transmits the image light (for example, right circularly polarized light) and the left-eye polarization selecting element intercepts the image light (for example, right circularly polarized light). On the other hand, when the left-eye image is displayed on the DMD 5, the control unit 202 controls the polarizing shutter glasses 403 in such a way that the right-eye polarization selecting element intercepts the image light (for example, right circularly polarized light) and the left-eye polarization selecting element transmits the image light (for example, right circularly polarized light).

In this way, the lights after polarization splitting at the PBS prism 71 are turned into identical circular polarized light by the quarter-wave plate 304 and then let out, and the image light is directed to an observer's right and left eyes alternately by the polarizing shutter glasses 403. This enables the observer to perceive a stereoscopic image.

In view of the foregoing, an image projecting device according to the invention may be said to be so designed as to include a DMD 5 as a display element, a projection optical system 6, and a control unit 202 which controls the DMD 5 and polarizing shutter glasses 403, wherein the projection optical system 6 includes a first polarization converting element (a polarization converting element 303, a half-wave plate) which converts one (for example, S-polarized light) of the lights polarization-split at a PBS prism 71 into light (for example, P-polarized light) with the same polarization direction as the other and a second polarization converting element (a polarization converting element 304, a quarter-wave plate) which converts the light (for example, P-polarized light) that, after the polarization splitting, is incident via the first polarization selecting element and the other (for example, P-polarized light) of the lights after the polarization splitting simultaneously into identical circularly polarized light, and the control unit 202 makes the DMD 5 perform image display on a time-division basis and in addition switches, synchronously with the image display and alternately between left and right on a time-division basis, light transmission through polarization selecting elements arranged for the right and left eyes in the polarizing shutter glasses 403 that selectively transmit the same circularly polarized light as the projection light onto a screen SC.

The designs in FIGS. 20 and 21 can be summarized as follows: an image projecting device according to the invention may be said to be so designed as to include a DMD 5 as a display element, a projection optical system 6, and a control unit 202 which controls the DMD 5 and polarizing shutter glasses 402, wherein the projection optical system 6 includes polarization converting means which converts one (for example, S-polarized light) of two types of polarized lights polarization-split at a PBS prism 71 into light in the same polarization state (for example, linearly or circularly polarized light) and lets it out, and the control unit 202 makes the DMD 5 perform image display on a time-division basis and in addition switches, synchronously with the image display and alternately between left and right on a time-division basis, light transmission through polarization selecting elements arranged for the right and left eyes in the polarizing shutter glasses that selectively transmit the same polarized light as the projection light onto a screen SC. The polarization converting means may be composed of the above-mentioned polarization converting element 303 alone, or may be composed of the above-mentioned polarization converting elements 303 and 304.

(5. Projection of a High-Definition Image (Part 1))

Figure 22:
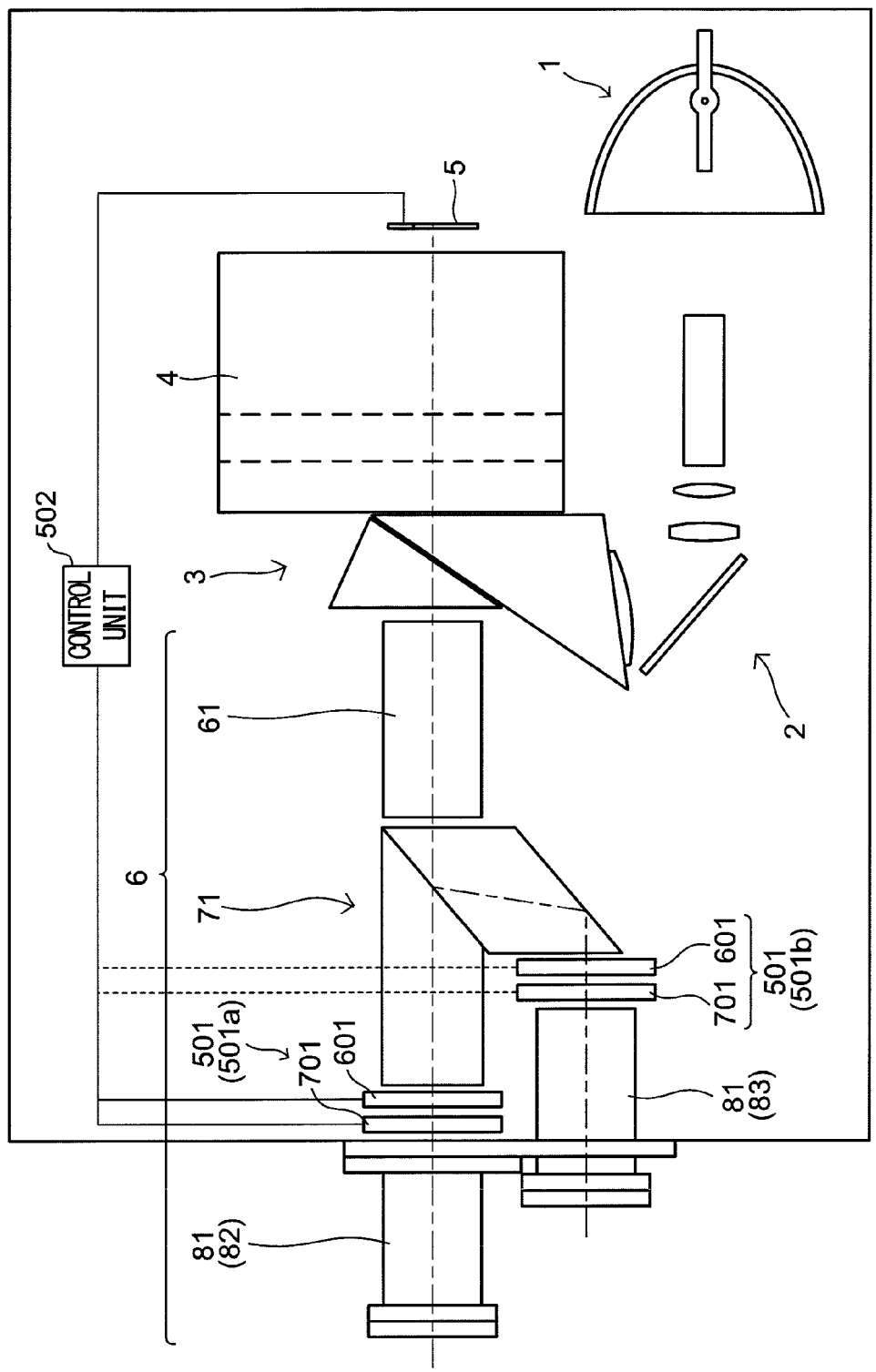
FIG. 22 is an illustrative diagram showing an outline of the design of the image projecting device that projects a high-definition image.

Next, a description will be given of an image projecting device according to the invention which achieves projection of a high-definition image. FIG. 22 is an illustrative diagram showing an outline of the design of an image projecting device that projects a high-definition image. This image projecting device includes, in addition to the basic design described above, a pixel shift mechanism 501 and a control unit 502. The pixel shift mechanism 501 constitutes part of the projection optical system 6.

The pixel shift mechanism 501 is polarization controlling means that controls the polarization states of the lights polarizations-split at the PBS prism 71, and, while varying the polarization states of the lights after polarization splitting, shifts the projection position half a pixel. The pixel shift mechanism 501 is provided in the optical paths of those lights between the PBS prism 71 and the projection lens 81. Wherever distinction is needed between two pixel shift mechanisms 501, the one disposed in the optical path of one (for example, P-polarized light) of the linearly polarized lights polarization-split at the PBS prism 71 is referred to as the pixel shift mechanism 501*a*, and the one disposed in the optical path of the other (for example, S-polarized light) of the linearly polarized lights after polarization splitting is referred to as the pixel shift mechanism 501*b*. The pixel shift mechanism 501 will now be described in detail.

The pixel shift mechanism 501 is composed of a first shift unit 601 and a second shift unit 701. The first and second shift units 601 and 701 are arranged, each in a set, in this order from the PBS prism 71 in the optical paths of the lights after polarization splitting.

Figure 23:
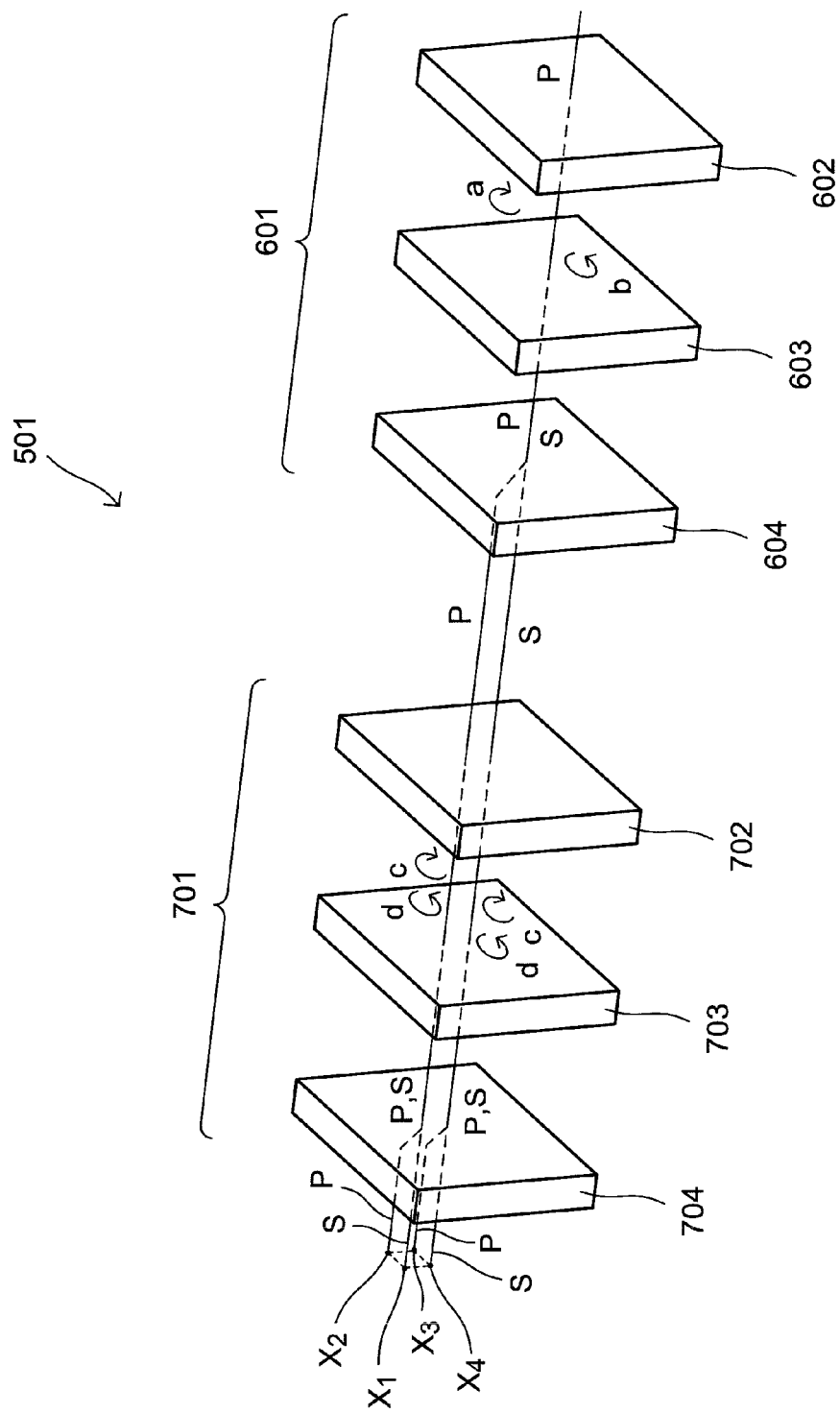
FIG. 23 is a perspective view showing a detailed design of the first and second shift unit in the projection optical system in the image projecting device.

FIG. 23 is a perspective view showing the detailed design of the first and second shift units 601 and 701. The first shift unit 601 includes, from the PBS prism 71 side, a polarization converting element 602, a quarter-wave plate 603, and a birefringent element 604. The second shift unit 701 includes, from the PBS prism 71 side, a polarization converting element 702, a quarter-wave plate 703, and a birefringent element 704.

The polarization converting elements 602 and 702 convert incident linearly polarized light into, and alternately between, lights in two mutually different polarization states (for example, right and left circularly polarized lights), and are each composed of a Z-Screen manufactured by Real D. The quarter-wave plates 603 and 703 are phase plates (second phase plates) that convert the lights in the two polarization states emerging from the polarization converting elements 602 and 702 into linearly polarized lights. The birefringent elements 604 and 704 either transmit or shift the linearly polarized light from the quarter-wave plates 603 and 703 according to their polarization direction; for example, they transmit S-polarized light, and doubly refract and then let out P-polarized light (shift its optical axis). The birefringent elements 604 and 704 are arranged so that the directions in which they shift linearly polarized light are perpendicular to each other.

The control unit 502 is a controller that controls the DMD 5 and the first and second shift units 601 and 701 in the pixel shift mechanism 501. More specifically, the control unit 502 makes the DMD 5 perform image display on a time-division basis and in addition, synchronously with the image display, makes at least one of the polarization converting elements 602 and 702 switch the emergent light between two polarization states (right and left circularly polarized lights) on a time-division basis.

The operation of the pixel shift mechanism 501 will now be described. The following discussion takes up the pixel shift mechanism 501*a* as an example.

The linearly polarized light (for example, P-polarized light) from the PBS prism 71 is converted into circularly polarized light (right or left circularly polarized light) at the polarization converting element 602 in the first shift unit 601, and is then converted back into linearly polarized light at the quarter-wave plate 603. Meanwhile, under the control of the control unit 502, the polarization converting element 602 switches the emergent light between right and left circularly polarized lights on a time-division basis, and this makes it possible to switch the light emerging from the polarization converting element 602 between lights with two mutually perpendicular polarization directions (for example, P- and S-polarized lights with respect to the PBS surface 73b of the PBS prism 71). The birefringent element 604 exploits the difference in refractive index between different polarization directions to displace (shift) the optical axis of P-polarized light as linearly polarized light half a pixel of the DMD 5 from the optical path of S-polarized light as linearly polarized light. That is, when the linearly polarized light incident on the birefringent element 604 is S-polarized light, the S-polarized light is as it is transmitted through the birefringent element 604; when the incident linearly polarized light is P-polarized light, the P-polarized light emerges with its optical axis shifted at the birefringent element 604.

The linearly polarized light emergent from the birefringent element 604 is incident on the polarization converting element 702 in the second shift unit 701, and the second shift unit 701 operates similarly to the first shift unit 601. Specifically, the linearly polarized light (P- or S-polarized light) from the birefringent element 604 is converted into circularly polarized light at the polarization converting element 702, and is then converted back to linearly polarized light at the quarter-wave plate 703. Meanwhile, under the control of control unit 502, the polarization converting element 702 switches the emergent light between right and left circularly polarized lights, and this makes it possible to switch the light emerging from the quarter-wave plate 703 between lights with two mutually perpendicular directions. The birefringent element 704 shifts the optical axis of P-polarized light as linearly polarized light half a pixel from the optical axis of S-polarized light as linearly polarized light. That is, when the linearly polarized light incident on the birefringent element 704 is S-polarized light, the S-polarized light is as it is transmitted through the birefringent element 704; when the incident linearly polarized light is P-polarized light, the P-polarized light emerges with its optical axis shifted at the birefringent element 704.

Here, since the birefringent elements 604 and 704 are arranged so that the directions in which they shift linearly polarized light are perpendicular to each other, the first shift unit 601 can shift the position of the projection frame half a pixel in the up-down direction, and the second shift unit 701 can shift the position of the projection frame half a pixel in the left-right direction.

Figure 24:
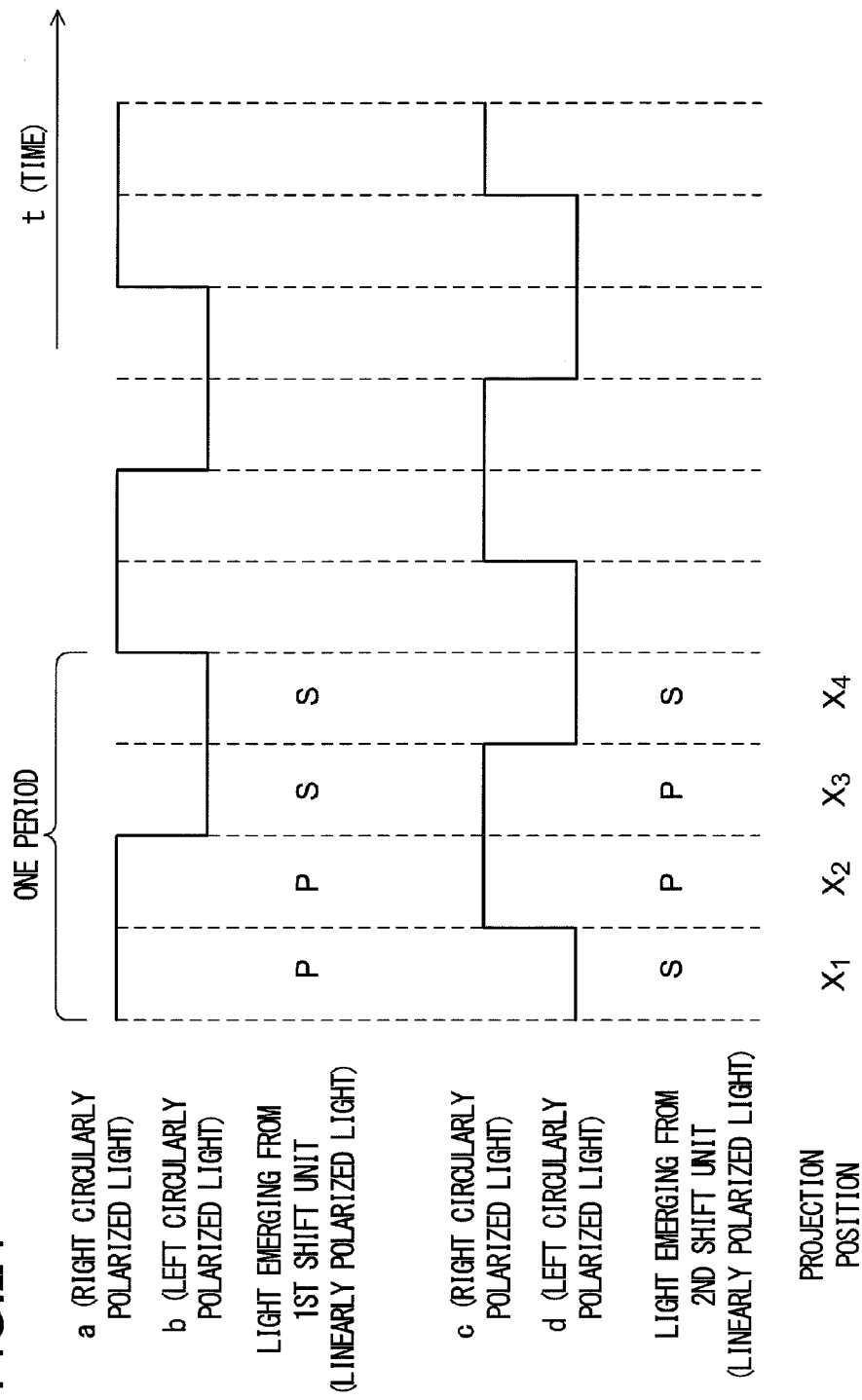
FIG. 24 is an illustrative diagram schematically showing the drive waveforms for the polarization converting elements in the first and second shift units.

FIG. 24 is an illustrative diagram schematically showing the driving waveforms for the polarization converting elements 602 and 702. In a case where the light incident on the polarization converting element 602 is, for example, P-polarized light, when the control unit 502 drives the polarization converting elements 602 and 702 in the manner described below, the image light from a given pixel on the DMD 5 is directed through the first projection lens 82 to one of positions $X_1$ to $X_4$ (see FIG. 23) on the screen.

Specifically, driving the polarization converting element 602 so that the emergent light is right circularly polarized light and driving the polarization converting element 702 so that the emergent light is left circularly polarized light causes the image light from a given pixel on the DMD 5 to be directed to position $X_1$ on the screen. Driving the polarization converting element 602 so that the emergent light is right circularly polarized light and driving the polarization converting element 702 so that the emergent light is right circularly polarized light causes the image light from a given pixel on the DMD 5 to be directed to position $X_2$ on the screen. Driving the polarization converting element 602 so that the emergent light is left circularly polarized light and driving the polarization converting element 702 so that the emergent light is right circularly polarized light causes the image light from a given pixel on the DMD 5 to be directed to position $X_3$ on the screen. Driving the polarization converting element 602 so that the emergent light is left circularly polarized light and driving the polarization converting element 702 so that the emergent light is left circularly polarized light causes the image light from a given pixel on the DMD 5 to be directed to position $X_4$ on the screen.

That is, as shown in FIG. 24, by making the polarization converting elements 602 and 702 switch between right and left circularly polarized lights with an equal period and with a phase difference of a quarter (¼) of the period, it is possible to change the projection position sequentially among four positions, namely from an upper left position (position $X_1$) to an upper right position (position $X_2$) to a lower right position (position $X_3$) to a lower left position (position $X_4$) and so forth. Thus, by displaying images corresponding to those four projection positions on the DMD 5 on a time-division basis, it is possible to project a high-definition image equivalent to four times the ordinary number of pixels. That is, by use of a DMD 5 with 2048×1080 pixels, called 2K, it is possible to obtain a projected image equivalent to 4096×2160 pixels, called 4K.

The pixel shift mechanism 501b disposed in the other optical path operates in a manner similar to that described above. Thus, also the pixel shift mechanism 501b permits images to be projected through the second projection lens 83 while the projection position is shifted sequentially among four positions half a pixel from one to the next. Here, by arranging, in the pixel shift mechanism 501b, the birefringent elements 604 and 704 so that the projection position by the second projection lens 83 coincides with the projection position by the first projection lens 82, and controlling the polarization converting elements 602 and 702 so that their projection positions coincide also temporally, it is possible, without losing the definition quality of the projection image by the first projection lens 82 which has quadruple pixel information, to project the image with double brightness.

In the above description, between the polarization converting elements 602 and 702, the period of switching between right and left circularly polarized lights is the same. The period of switching, however, may differ between them, for example, such that the period of switching in one is half that in the other. In the above-described case where the period of switching is equal, to change the projection position among four positions, synchronously with image display on the DMD 5 (corresponding to the intervals between the broken lines in FIG. 24), switching between the two polarization states needs to be performed in either polarization converting element 602 or 702. In a case where the period for switching differs, to change the projection position among four positions, synchronously with image display on the DMD 5, switching between the two polarization states needs to be performed in either polarization converting element 602 or 702 or both.

As described above, the projection optical system 6 is provided with the pixel shift mechanism 501 described above, and thus by applying it to an image projecting device, it is possible to project a high-definition image. In particular, the pixel shift mechanism 501 is composed of the first and second shift units 601 and 701, and thus by switching, among four positions, the projection position of the image by the light emerging from the second shift unit 701, it is possible to virtually increase the number of pixels of the projection image.

Moreover, in the image projecting device according to the embodiment under discussion, the control unit 502 makes the DMD 5 perform image display on a time-division basis and in addition makes, synchronously with the image display, at least one of the polarization converting elements 602 and 702 in the first and second shift units 601 and 701 switch the emergent light between two polarization states on a time-division basis. This makes it possible to change the projection position of the image by the light emerging from the second shift unit 701 among four positions with respect to the light from the same pixels on the DMD 5, and thus to reliably obtain a high-definition projection image by pixel shifting.

To improve the purity of polarized lights, and to reduce cross talk in the projection image in four positions corresponding to the same pixels on the DMD 5, a polarizing plate may be disposed on the PBS prism 71 side of the polarization converting element 602.

Even when the pixel shift mechanism 501 is disposed on the screen side of the projection lens 81, the position of the projection frame can be shifted half a pixel in a manner similar to that described above. Depending on the zoom condition of the projection lens 81 or the size of the projection frame, however, the amount of the shift of the optical axis by the birefringent elements 604 and 704 needs to be changed. In this respect, in the embodiment under discussion, the pixel shift mechanism 501 is disposed on the intermediary image side (PBS prism 71 side) of the projection lens 81, and thus, irrespective of the zoom condition of the projection lens 81 or the size of the projection frame, the amount of the shift of the optical axis can be kept constant.

(6. Projection of a High-Definition Image (Part 2))

Figure 25:
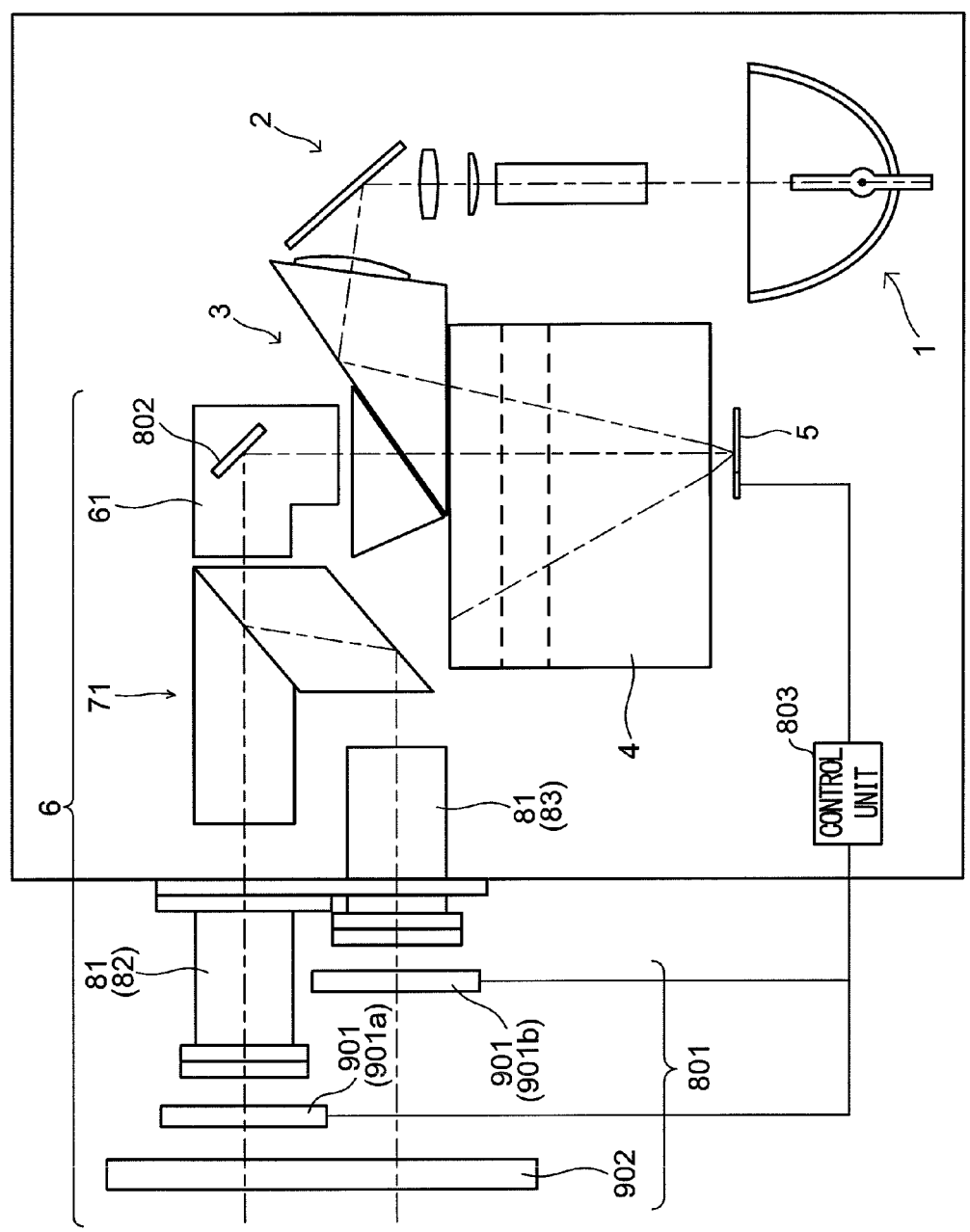
FIG. 25 is an illustrative diagram showing another design of an image projecting device that projects a high-definition image.

Next, a description will be given of another design of an image projecting device according to the invention which achieves projection of a high-definition image. FIG. 25 is an illustrative diagram of another design of an image projecting device which projects a high-definition image. This image projecting device is provided with, in addition to the basic design described above, polarization controlling means 801, a micro-vibration mirror 802, and a control unit 803. The polarization controlling means 801 and the micro-vibration mirror 802 constitute part of the projection optical system 6. In the embodiment under discussion, the positions of the two projection lens 81 are so set that the projection images by those two projection lenses 81 are shifted half a pixel from each other on the screen. The direction of the half-a-pixel shift is, for example, the up-down direction in which the two projection lenses 81 are arranged, but may instead be the left-right direction.

The polarization controlling means 801 controls the polarization states of the lights polarization-split at the PBS prism 71 and their projection onto the screen. More specifically, the polarization controlling means 801 controls the polarization states of the lights polarization-split at the PBS prism 71 and their projection onto the screen in such a way that the projection images by the two projection lenses 81 are projected alternately on the screen. To achieve such control, the polarization controlling means 801 is composed of a polarization converting element 901 and a polarizing plate 902.

The polarization converting element 901 is composed of two polarization converting elements 901a and 901b which are provided on the screen side of the projection lenses 81 in the optical paths of the lights polarization-split at the PBS prism 71. The polarization converting element 901a converts one (for example, P-polarized light) of the lights polarization-split at the PBS prism 71 into, and alternately between, a first polarization state (for example, right circularly polarized light) and a second polarization state (for example, left circularly polarized light). On the other hand, the polarization converting element 901b converts the other (for example, S-polarized light) of the polarization-split lights into, and alternately between, the second polarization state (for example, left circularly polarized light) and the first polarization state (for example, right circularly polarized light).

The polarizing plate 902 is a polarizing plate (right circular polarizing plate) that transmits the light in one polarization state (for example, right circularly polarized light) resulting from the conversion at the polarization converting element 901 and that intercepts the light in the other polarization state (for example, left circularly polarized light), and is disposed on the screen side of the polarization converting element 901 so as to be shared by the two optical paths.

The micro-vibration mirror 802 vibrates with a predetermined period in the direction (for example, left-right direction) perpendicular to the direction (for example, up-down direction) of the shift between the projection images by the two projection lenses 81 so as thereby to bend the optical path of the image light from the DMD 5, and is composed of, for example, a reflective mirror and a piezoelectric element or voice coil motor that makes it vibrate microscopically. In the embodiment under discussion, the micro-vibration mirror 802 is disposed in the optical path within the relay optical system 61 in the projection optical system 6.

The control unit 803 is a controller that controls the DMD 5 and the polarization controlling means 801. More specifically, the control unit 803 makes the DMD 5 display images on a time-division basis, and in addition makes, synchronously with the image display, the polarization controlling means 801 project the projection image by one of the two projection lens 81 onto the screen on a time-division basis. Moreover, the control unit 803 controls the micro-vibration mirror 802 so as to determine the direction in which it reflects the image light synchronously with the image display.

In the design described above, the light transmitted through the first projection lens 82 is P-polarized light with respect to the PBS surface 73b of the PBS prism 71; when this P-polarized light is incident on the polarization converting element 901a, it is there switched between right and left circularly polarized lights at high speed and then let out. The light emerging from the polarization converting element 901a, when it is right circularly polarized light, is transmitted through the polarizing plate 902 and reaches the screen but, when it is left circularly polarized light, is intercepted by the polarizing plate 902 and does not reach the screen.

On the other hand, the light transmitted through the second projection lens 83 is S-polarized light with respect to the PBS surface 73b of the PBS prism 71; when this S-polarized light is incident on the polarization converting element 901b, it is there switched between left and right circularly polarized lights at high speed and then let out. The light emerging from the polarization converting element 901b, when it is left circularly polarized light, is intercepted by the polarizing plate 902 and does not reach the screen but, when it is right circularly polarized light, is transmitted through the polarizing plate 902 and reaches the screen.

In this way, the control unit 803 controls the polarization converting elements 901a and 901b in such a way that, when the projection light by the first projection lens 82 is converted into right circularly polarized light by the polarization converting element 901a, the projection light by the second projection lens 83 is converted into left circularly polarized light by the polarization converting element 901b, and in addition that, when the projection light by the first projection lens 82 is converted into left circularly polarized light by the polarization converting element 901a, the projection light by the second projection lens 83 is converted into right circularly polarized light by the polarization converting element 901b. As a result, the projection light by the first projection lens 82 and the projection light by the second projection lens 83 are projected alternately onto the screen. That is, according to a signal from the control unit 803, the polarization controlling means 801 makes the polarization states of the lights after polarization splitting different from each other, between right and left circularly polarized lights, and switches alternately between those polarization states, and as a result the projection image by the first projection lens 82 and the projection image by the second projection lens 83 are projected alternately onto the screen.

Here, in the embodiment under discussion, the projection positions of the projection images by the first and second projection lenses 82 and 83 are shifted half a pixel from each other, and thus, by displaying images corresponding to those shifted positions on a time-division basis on the DMD 5, it is possible to obtain a projected image with double pixel information in the up-down direction.

Moreover, the control unit 803 makes the micro-vibration mirror 802 disposed in the optical path of the relay optical system 61 vibrate, and this makes it possible to project the projection images by the first and second projection lenses 82 and 83 half a pixel shifted in the left-right direction. In addition, the high-speed vibration of the micro-vibration mirror 802 permits high-speed switching between the left and right projection positions during image projection. Thus, by displaying on the DMD 5 on a time-division basis images corresponding to the projection positions shifted in the left-right direction by the micro-vibration mirror 802, it is possible to obtain a projected image with double pixel information in the left-right direction as well as in the up-down direction.

Thus, by performing the pixel shifting in the up-down direction by the polarization controlling means 801 in combination with the pixel shifting in the left-right direction by the micro-vibration mirror 802, it is possible to project images in four projection positions and, by displaying on the DMD 5 images corresponding to those four projection positions, it is possible to project a high-definition image corresponding to four times the ordinary number of pixels. That is, by use of a DMD 5 with 2048×1080 pixels, called 2K, it is possible to obtain a projected image equivalent to 4096×2160 pixels, called 4K.

For example, suppose that the direction in which the micro-vibration mirror 802 reflects the image light from the DMD 5 is the left-right direction, and that the projection position by the first projection lens 82 is half a pixel higher than the projection position by the second projection lens 83. In this case, the micro-vibration mirror 802 and the polarization converting elements 901a and 901b are driven and controlled according to patterns A to D shown in FIG. 26, and, synchronously with the image display onto DMD 5, the direction in which the micro-vibration mirror 802 reflects the image light is determined to be the left or right directions. This makes it possible, as shown in FIG. 27, to project images sequentially in the four projection positions that are shifted half a pixel from one to the next. Thus, by displaying on the DMD 5 images corresponding to the four projection positions, it is possible to obtain a projected image with a quadruple amount of image information.

As described above, the polarization controlling means 801 alternately projects the projection images by the two projection lenses 81 onto the screen; thus, with a setting such that two projection images are half a pixel shifted relative to each other on the screen, it is possible to obtain a projected image with at least a double number of pixels (when the pixel shifting by the micro-vibration mirror 802 is combined together, a quadruple number of pixels). In particular, when the polarization controlling means 801 is composed of the polarization converting element 901 and the polarizing plate 902 described above, it is possible to reliably project the projection images by the two projection lenses 81 alternately onto the screen, and thus to reliably obtain the benefits mentioned above.

Moreover, under the control of the control unit 803, synchronously with the image display on the DMD 5 on a time-division basis, the projection image by one of the two projection lenses 81 is projected onto the screen; thus, by displaying on the DMD 5 different images at different times of image projection, it is possible to realize an image projecting device that produces a high-definition projected image with at least a double number of pixels.

Furthermore, the control unit 803 controls the micro-vibration mirror 802 so as to determine the direction in which it reflects the image light synchronously with the image display on the DMD 5, and this makes it possible to obtain a projected image with a double number of pixels in a direction (left-right direction) different from the direction (up-down direction) in which the projection images by the two projection lenses 81 are shifted. When this is combined with the pixel shifting in the up-down direction by the polarization controlling means 801, it is possible to obtain a high-definition projected image with a quadruple number of pixels.

In FIG. 26, during four consecutive times of image display on a time-division basis, the micro-vibration mirror 802 is made to vibrate one time in the left and right directions, and thus the vibration of the micro-vibration mirror 802 is not synchronous with the image display on the DMD 5. Needless to say, when the polarization converting elements 901a and 901b are driven and controlled properly, by making the micro-vibration mirror 802 vibrate synchronously with the image display on the DMD 5, it is possible to switch the projection position among four positions.

(7. Summary)

As shown in FIG. 1, the projection optical system 6 according to the embodiment under discussion is a projection optical system that directs the image light from the DMD 5 to the screen, and includes the relay optical system 61 which relays the image light to form an intermediary image M of the display image on the DMD 5, the PBS prism 71 which polarization-splits the image light from the relay optical system 61 to form two intermediary images M, and the two projection lenses 81 which project, on an enlarged scale, the two intermediary images M (intermediary images M1 and M2) onto the screen so that they are substantially overlaid together on the screen. The image projecting device according to the embodiment under discussion includes the DMD 5 which displays an image and the projection optical system 6 according to the embodiment under discussion which directs the image light from the DMD 5 to the screen.

The intermediary images M1 and M2 are images formed by polarization-split lights; thus, in the image projecting device, by controlling the image display on the DMD 5 while controlling the polarization states of those lights, it is possible, as described above, to project a stereoscopically viewable image, and to project a high-definition image by pixel shifting. In addition, by performing polarization splitting between the relay optical system 61 and the projection lens 81, it is possible to project various images without an increase in the size of the optical system and without degradation in image quality ascribable to a manufacturing error. Furthermore, the two intermediary images M1 and M2 are formed by the same relay optical system 61 and are hence identical; thus, the two images can be overlaid together with no deviation.

Moreover, providing the relay optical system 61 to project the intermediary images M1 and M2 of the display image, compared with not providing it, helps shorten the back-focal length of the projection lens 81, and thus helps make the projection lens 81, and hence the projection optical system 6, smaller and compact. Thus, it is possible to project various images with a compact image projecting device. Considering the design in which there is provided a single DMD 5 as a display element and the illumination optical system 2 directs illumination light to the single DMD 5, the effect of making the image projecting device compact as mentioned above is far more remarkable than in a design in which two display elements are provided.

Furthermore, making the projection lenses 81 compact helps reduce their lens diameters, and thus helps reduce the distance between them. This makes it possible to reduce the displacement between the two projection images that are overlaid together on the screen.

Moreover, the image projecting device according to the embodiment under discussion includes the light source 1 which emits light and the illumination optical system 2 which directs the light from the light source 1 to the DMD 5; thus, even in a case where a display element of a non-self-luminous type, such as the DMD 5, is used, the light from the light source 1 can be directed via the illumination optical system 2 to the DMD 5 to display an image, and thereby to display various images. A display element of a self-luminous type (for example, an LED array) may be used, in which case, needless to say, the light source 1 and the illumination optical system 2 are no longer necessary.

Although the embodiment under discussion deals with an example where a PBS prism 71 is used as a polarization selecting element, it is possible to use instead a plate comprising a wire grid and a reflective surface. The plate has, formed on its obverse surface, a wire grid composed of plurality of pieces of metal wire arranged at regular intervals, and has a reflective surface formed on the reverse surface; it reflects, of the light incident on the wire grid, linearly polarized light polarized in the direction parallel to the wire to direct it to one projection lens, and transmits linearly polarized light polarized in the direction perpendicular to the wire and then reflects it on the just-mentioned reflective surface to direct it to the other projection lens. Also when such a plate is used as a polarization selecting element, it is possible to form two intermediary images M by polarization splitting and project them through the corresponding projection lenses 81 onto the screen.

INDUSTRIAL APPLICABILITY

Projection optical systems according to the present invention find application in image projection devices that incorporate one display element and that project an image.

| List of Reference Signs | |
|---|---|
| 1 | light source |
| 2 | illumination optical system |
| 5 | DMD (display element) |
| 6 | projection optical system |
| 61 | relay optical system |
| 71 | PBS prism (polarization selecting element) |
| 71' | PBS prism (polarization selecting element) |
| 74 | prism block |

-continued

| List of Reference Signs | |
|---|---|
| 75 | prism block |
| 76 | PBS film |
| 77 | prism |
| 78 | prism |
| 79 | prism |
| 81 | projection lens |
| 82 | projection lens |
| 82a | zoom ring (zoom mechanism) |
| 83 | projection lens |
| 83a | zoom ring (zoom mechanism) |
| 91 | zoom mechanism |
| 101 | shift mechanism (first shift mechanism, second shift mechanism) |
| 101a | first mount portion (first shift mechanism, second shift mechanism) |
| 111 | correction mechanism |
| 111a | second mount portion (correction mechanism) |
| 201 | polarization controlling means |
| 202 | control unit |
| 301 | half-wave plate (first phase plate) |
| 302 | polarization converting element |
| 302a | polarization converting element |
| 302b | polarization converting element |
| 501 | pixel shift mechanism (polarization controlling means) |
| 501a | pixel shift mechanism (polarization controlling means) |
| 501b | pixel shift mechanism (polarization controlling means) |
| 502 | control unit |
| 601 | first shift unit |
| 602 | polarization converting element |
| 603 | quarter-wave plate (second phase plate) |
| 604 | birefringent element |
| 701 | second shift unit |
| 702 | polarization converting element |
| 703 | quarter-wave plate (second phase plate) |
| 704 | birefringent element |
| 801 | polarization controlling means |
| 802 | micro-vibration mirror |
| 803 | control unit |
| 901 | polarization converting element |
| 902 | polarizing plate |
| M | intermediary image |
| M1 | intermediary image |
| M2 | intermediary image |
| SC | screen |

The invention claimed is:

1. A projection optical system for directing image light from a display element to a projection surface, comprising:
a relay optical system which relays the image light to form an intermediary image of a display image on the display element;
a polarization splitting element which polarization-splits the image light emerging from the relay optical system to form two intermediary images as said intermediary image; and
two projection lenses which project the two intermediary images on an enlarged scale onto the projection surface so that the images are substantially overlaid together on the projection surface
wherein the relay optical system is substantially telecentric both to a display-element side and to a projection-surface side, and
if an absolute value of a magnification of the relay optical system be $\beta$, an equivalent aerial distance from an entrance surface of a most display-element-side lens to a display element surface be La, and an equivalent aerial distance from an exit surface of a most projection-surface-side lens to the intermediary image be Lb, then a formula $$\beta/3 < Lb/La < \beta$$

is fulfilled.

2. The projection optical system according to claim 1, wherein let an absolute value of a magnification of the relay optical system be β, then a formula $$1<\beta<3$$

is fulfilled.

3. An image projection device comprising:
a display element which displays an image; and
a projection optical system which directs image light from the display element to a projection surface, wherein
the projection optical system comprises the projection optical system according claim 1.

4. The image projection device according to claim 1, further comprising:
a light source which emits light; and
an illumination optical system that directs light from the light source to the display element.

5. A projection optical system for directing image light from a display element to a projection surface, comprising:
a relay optical system which relays the image light to form an intermediary image of a display image on the display element;
a polarization splitting element which polarization-splits the image light emerging from the relay optical system to form two intermediary images as said intermediary image; and
two projection lenses which project the two intermediary images on an enlarged scale onto the projection surface so that the images are substantially overlaid together on the projection surface;
further comprising:
a correction mechanism which corrects a relative deviation in position between two projection images by the two projection lenses on the projection surface; and
a zoom mechanism which varies a projection magnification of the projection lens, wherein the correction mechanism and the zoom mechanism are provided in at least one of the two projection lenses.

6. The projection optical system according to claim 5, wherein the correction mechanism corrects the deviation in position between the two projection images on the projection surface by decentering part of lenses within the projection lens.

7. The projection optical system according to claim 5, further comprising a first shift mechanism which moves the two projection lenses together parallel to a display surface of the display element.

8. The projection optical system according to claim 5, further comprising a second shift mechanism which moves at least one of the two projection lenses and the relay optical system together parallel to a display surface of the display element.

9. The projection optical system according to claim 7, wherein the first shift mechanism moves the two projection lenses and the relay optical system together parallel to the display surface of the display element.

10. The projection optical system according to claim 5, wherein
the polarization splitting element comprises, joined together:
a polarization splitting film which polarization-splits incident light; and
two prism blocks which bends optical paths of lights polarization-split at the polarization splitting film, and
the two prism blocks
each comprise at least one prism, and
bend the optical paths of the lights after polarization splitting such that positions of the two intermediary images in the optical paths of the lights coincide in an optical axis direction of the relay optical system.

11. The projection optical system according to claim 5, wherein lengths of the two projection lenses in an optical axis direction are set such that positions of most projection-surface-side exit surfaces thereof coincide in the optical axis direction.

12. A projection optical system for directing image light from a display element to a projection surface, comprising:
a relay optical system which relays the image light to form an intermediary image of a display image on the display element;
a polarization splitting element which polarization-splits the image light emerging from the relay optical system to form two intermediary images as said intermediary image; and
two projection lenses which project the two intermediary images on an enlarged scale onto the projection surface so that the images are substantially overlaid together on the projection surface;
further comprising a polarization controller which controls polarization states of the lights polarization-split at the polarization splitting element, wherein
the polarization controller controls polarization states of incident lights such that polarization states of emergent lights are identical between the optical paths of the lights and in addition switch alternately between two different polarization states.

13. The projection optical system according to claim 12, wherein the polarization controller comprises:
a first phase plate which converts one of the lights polarization-split at the polarization splitting element into a same polarization direction as another of the lights; and
a polarization converting element which converts said one of the lights incident via the first phase plate after polarization splitting at the polarization splitting element and said another of the lights after polarization splitting simultaneously into, and alternately between, two mutually different polarization states.

14. The projection optical system according to claim 12, wherein
the polarization controller comprises two polarization converting elements which individually convert the polarization states of the lights after polarization-splitting at the polarization splitting element and which convert incident linearly polarized lights into, and alternately between, two mutually different polarization states, and
the polarization converting elements are driven differently to convert the polarization states of the lights polarization-split at the polarization splitting element such that polarization states of emergent lights are identical.

15. The projection optical system according to claim 13, wherein the polarization converting element is disposed in optical paths of the two projection lenses.

16. The projection optical system according claim 12, further comprising a polarization controller which controls polarization states of the lights polarization-split at the polarization splitting element, wherein
the polarization controller comprises a pixel shift mechanism which moves projection position half a pixel while changing the polarization states of the lights after polarization-splitting.

17. The projection optical system according to claim 16, wherein the pixel shift mechanism comprises first and second shift units disposed, each in a set, in the optical paths of the lights after polarization-splitting, the first and second shift units each comprise:
a polarization converting element which converts incident linearly polarized lights into, and alternately between, two mutually different polarization states;
a second phase plate which converts the lights in two polarization states into linearly polarized lights; and
a birefringent element which either transmits or shifts the linearly polarized lights from the second phase plate according to polarization directions thereof,
the birefringent element in the first shift unit and the birefringent element in the second shift unit are arranged so as to shift the linearly polarized lights in mutually perpendicular directions.

18. The projection optical system according to claim 12, further comprising a polarization controller which controls polarization states of, and projection onto the projection surface of, the lights polarization-split at the polarization splitting element, wherein
positions of the two projection lenses are set such that projection images by the two projection lenses are shifted half a pixel relative to each other on the projection surface, and
the polarization controller controls the polarization states of, and the projection onto the projection surface of, the lights after polarization splitting such that the projection images by the two projection lenses are projected alternately onto the projection surface.

19. The projection optical system according to claim 18, wherein
the polarization controller comprises:
a polarization converting element which converts one of the lights polarization-split at the polarization splitting element into, and alternately between, first and second polarization states and which converts another of the polarization-split lights into, and alternately between, the second and first polarization states; and
a polarizing plate which transmits, of the lights polarization-split at the polarization splitting element, the light in one polarization state and intercepts the light in another polarization state.

20. An image projection device comprising:
a display element which displays an image; and
a projection optical system which directs image light from the display element to a projection surface, wherein
the projection optical system comprises the projection optical system according to claim 12,
the image projection device further comprises a control unit which controls the display element and the polarization controller of the projection optical system, and
the control unit makes the display element perform image display on a time-division basis and in addition makes, synchronously with the image display, the polarization means controller switch the emergent lights between the two polarization states on a time-division basis.

21. An image projection device comprising:
a display element which displays an image; and
a projection optical system which directs image light from the display element to a projection surface, wherein
the projection optical system comprises the projection optical system according to claim 17,
the image projecting device further comprises a control unit which controls the display element and the first and second shift units of the projection optical system, and
the control unit makes the display element perform image display on a time-division basis and in addition makes, synchronously with the image display, the polarization converting element of at least one of the first and second shift units switch the emergent lights between the two polarization states on a time-division basis.

22. An image projection device comprising:
a display element which displays an image; and
a projection optical system which directs image light from the display element to a projection surface, wherein
the projection optical system comprises the projection optical system according claim 18,
the image projecting device further comprises a control unit which controls the display element and the polarization controller of the projection optical system, and
the control unit makes the display element perform image display on a time-division basis and in addition makes, synchronously with the image display, the polarization controller projects the projection image by one of the two projection lenses on the projection surface on a time-division basis.

23. The image projection device according to claim 22, wherein the polarization controller, according to a signal from the control unit, brings the lights after polarization splitting in mutually different polarization states and in addition switch alternately between those polarization states.

24. The image projection device according to claim 22, further comprising a micro-vibration mirror which vibrates with a predetermined period in a direction perpendicular to a direction in which the projection images by the two projection lenses are shifted and which thereby bends an optical path of the image light, wherein the control unit controls the micro-vibration mirror so as to determine a direction in which the micro-vibration mirror reflects the image light synchronously with the image display on the display element.

25. The projection optical system according to claim 14, wherein the polarization converting elements are disposed in optical paths of the two projection lenses.

* * * * *